US009695608B2

(12) United States Patent
French

(10) Patent No.: US 9,695,608 B2
(45) Date of Patent: Jul. 4, 2017

(54) RECONFIGURABLE RESIDENTIAL UNIT

(71) Applicant: District Homes, LLC, Washington, DC (US)

(72) Inventor: Christopher D. French, Washington, DC (US)

( * ) Notice: Subject to any disclaimer, the term of this patent is extended or adjusted under 35 U.S.C. 154(b) by 0 days.

(21) Appl. No.: 15/198,398

(22) Filed: Jun. 30, 2016

(65) Prior Publication Data
US 2017/0002579 A1    Jan. 5, 2017

Related U.S. Application Data

(60) Provisional application No. 62/187,514, filed on Jul. 1, 2015.

(51) Int. Cl.
*E04B 1/00* (2006.01)
*E04G 21/00* (2006.01)
(Continued)

(52) U.S. Cl.
CPC ........... *E04H 1/04* (2013.01); *E04B 1/34321* (2013.01); *E04B 1/34807* (2013.01); *E04C 2/523* (2013.01); *E04C 2/525* (2013.01); *E04F 11/02* (2013.01); *E04H 1/005* (2013.01); *E04B 2/00* (2013.01); *E04B 2/7407* (2013.01); *E04B 2/7433* (2013.01); *E04B 5/00* (2013.01); *E04B 5/48* (2013.01); *E04B 2002/0256* (2013.01); *E04F 17/04* (2013.01); *E04F 17/08* (2013.01); *E04H 1/02* (2013.01); *H02G 3/0425* (2013.01); *H02G 3/0493* (2013.01)

(58) Field of Classification Search
CPC ........ E04F 17/04; E04F 17/08; H02G 3/0425; H02G 3/0493; E04B 5/48; E04B 2/00; E04B 2002/0256; E04B 2/7407; E04B 2/7433; E04B 5/00; E04B 1/34321; E04B 1/34326; E04B 1/34807; E04H 1/005; E04H 1/04; E04H 1/02; E04C 2/525; E04C 2/523
USPC ... 52/220.5, 287.1, 506.07, 79.1, 79.2, 79.8, 52/220.1, 238.1, 234, 745.09, 745.02, 52/745.2, 79.9, 79.13, 236.3, 236.7, 52/236.6, 236.9
See application file for complete search history.

(56) References Cited

U.S. PATENT DOCUMENTS 3,510,997 A * 5/1970 Ratych ................ E04B 1/34823
52/262
3,710,534 A * 1/1973 McNamara, Jr. ... E04B 1/34823
264/33
(Continued)

OTHER PUBLICATIONS

Tedd Benson, The New House Rules, Category Archives: Open Building, Apr. 16, 2014; http://teddbenson.com/category/open-building.
(Continued)

*Primary Examiner* — Chi Q Nguyen
(74) *Attorney, Agent, or Firm* — McGuireWoods LLP

(57) ABSTRACT

A "future-enabled" rowhouse or similar residential unit is provided that may include a site-adaptable chassis for a rowhouse or similar residential unit construction that can be easily adjusted to varying site conditions (e.g., lot widths and depths) at the time of construction and that allows for cost-effective future reconfiguration of building systems and space configuration over the life of the building.

21 Claims, 15 Drawing Sheets

(51) Int. Cl.

| | | |
|---|---|---|
| *E04G 23/00* | (2006.01) | |
| *E04H 1/04* | (2006.01) | |
| *E04H 1/00* | (2006.01) | |
| *E04B 1/343* | (2006.01) | |
| *E04B 1/348* | (2006.01) | |
| *E04C 2/52* | (2006.01) | |
| *E04F 11/02* | (2006.01) | |
| E04B 5/48 | (2006.01) | |
| E04H 1/02 | (2006.01) | |
| E04B 2/74 | (2006.01) | |
| E04B 2/00 | (2006.01) | |
| H02G 3/04 | (2006.01) | |
| E04B 2/02 | (2006.01) | |
| E04B 5/00 | (2006.01) | |
| E04F 17/04 | (2006.01) | |
| E04F 17/08 | (2006.01) | |

(56) References Cited

U.S. PATENT DOCUMENTS

| | | | |
|---|---|---|---|
| 3,832,811 A * | 9/1974 | Briel, Jr. | E04B 1/3445 52/143 |
| 5,163,258 A | 11/1992 | Habraken et al. | |
| 5,528,866 A * | 6/1996 | Yulkowski | E04H 1/04 52/236.3 |
| 6,925,761 B1 * | 8/2005 | De La Marche | E04B 1/34815 52/220.1 |
| 7,921,609 B2 * | 4/2011 | Kordelin | B63B 29/025 114/71 |
| 8,186,109 B2 * | 5/2012 | Warminsky | E04H 9/10 52/745.02 |
| 8,621,787 B2 | 1/2014 | Barry et al. | |
| 8,707,640 B2 | 4/2014 | Wright | |
| 8,713,893 B2 | 5/2014 | Van Randen | |
| 8,826,630 B2 | 9/2014 | Van Randen | |
| 2005/0279035 A1 | 12/2005 | Donovan | |
| 2010/0077678 A1 | 4/2010 | Boardman | |
| 2011/0296769 A1 * | 12/2011 | Collins | E04B 1/003 52/79.1 |
| 2011/0296789 A1 * | 12/2011 | Collins | E04B 1/24 52/741.4 |
| 2013/0014451 A1 | 1/2013 | Russell et al. | |
| 2013/0025220 A1 * | 1/2013 | Yu | E04C 2/52 52/220.7 |
| 2015/0075086 A1 * | 3/2015 | Gosling | A47B 96/02 52/29 |

OTHER PUBLICATIONS

BuildingGreen, In his 1961 book, "Supports: An Alternative to Mass Housing", Dutch arthitect N. John Habraken, www2.building-green.com/article/future-proofing-your-building-designing-flexibilit . . . .

Open prototype initiative, "The approach", "OPEN Building Principles", printed Oct. 24, 2014; http://openprototype.com/index.php?gallery=-57-OPEN_1&info=-10-Open1_Features.

* cited by examiner

RECONFIGURABLE RESIDENTIAL UNIT

CROSS-REFERENCE TO RELATED APPLICATIONS

This application claims priority and benefit of U.S. Provisional Application No. 62/187,514 filed Jul. 1, 2015, the disclosure of which is incorporated by reference herein in its entirety.

BACKGROUND OF THE DISCLOSURE 1.0 Field of the Disclosure

This disclosure is directed generally to a method and system of constructing new residential units that allow for cost-effective site adaptation of the system and easy upgradability and adaptability of the residence over time, among other features.

2.0 Related Art

Buildings, and homes in particular, are typically inflexible after construction is complete. Decisions made during the design phase are usually locked in, and cannot be modified post-construction without major capital expense. The high costs make it prohibitively expensive for homeowners or occupants to adapt a home to changing needs or technologies. Future cost effective reconfiguration of a building, home, townhouse or apartment complex is typically limited because of non-uniform arrangement of services and structural features and physical barriers that prevent easy reconfiguration of a building, townhome, rowhouse, triplex, duplex, apartment complex or the like.

SUMMARY OF THE DISCLOSURE

In one aspect, a rowhouse floor plan (or similar residential unit) may be divided on long axis between "fixed-width" and "flexible-width" sections. The "fixed-width" section may extend the full height of the structure or residential unit and may include vertical circulation, mechanical, plumbing, and electrical systems distribution, and systems-intensive rooms such as bathrooms, laundry rooms, wet bars, wine cellars, kitchens/kitchenettes, closets and small rooms, etc., all of or some of which may be located in the fixed-width zone. Mechanical and plumbing systems may be routed through a dedicated bulkhead that may be configured to run a length of the building, such as, e.g., from front to back; the bulkhead may be, e.g. about 3' wide by about 2'-6" tall, including framing, but may vary. Vertical circulation (e.g., staircases and elevator(s), if provided) may be located adjacent to the party wall, between the bulkhead and the party wall. Multiple standard fixed-width zone sizes may be developed for the chassis; for example, a 6' wide zone allows for the systems bulkhead plus a straight run stair only; an 8' wide zone allows for a straight run or "C"-shaped stair, and a 10' wide zone allows for a straight run, "C"-shaped or switchback stair (which also would make split-level homes possible with this system, provided that one of the two vertical chases (or shafts) aligns with the split in floor levels).

Within the fixed-width zone, fixed-dimension rooms or spaces may be provided. Cost control may be maintained by concentrating systems-intensive rooms of pre-determined size L×W×H in the "fixed-width" zone immediately adjacent to the longitudinal bulkhead for shortest routing of systems piping, wiring, ducts, etc. The "fixed-width" zone provides a consistent predictable width, allowing for pre-design and cost evaluation for rooms/spaces in that zone that may be applied to all residential units constructed using the principles of the present disclosure.

A "flexible-width" section may allow the building width or residential unit width to be adjusted at the time of initial construction to accommodate different lot widths (rowhouses or similar units may span the full width of the lot, from lot line to lot line). Fixed-dimension rooms, based on the constraints established for the fixed-width zones, may be provided within the flex-width zones and connected to the services distribution spine via uninterrupted joist bays which may span from the bulkhead to the opposite party wall or exterior wall. The ceiling in the flexible-width zone may be fully accessible to allow for access to wiring, plumbing, and the like. The fixed-dimension rooms in the flexible-width zone provide similar cost efficiencies as when used in the fixed-width zone, and an access ceiling may provide easy access to service piping and ductwork serving rooms in the flexible-width zones. Together, the "fixed-width" and "flexible-width" sections may create a chassis that can be adapted consistently to different site widths.

Moreover, electrical and data wiring may be routed through raceways hidden behind a removable a wall base, a chair molding or paneling at the base of the wall, and may be accessible via crown molding raceways at the top of the wall. At party and exterior walls, furred-out partitions may provide space for routing electrical and data wiring between the top and bottom of the wall without compromising the fire resistance, structural, and/or weatherproofing functions of the party or exterior wall. Two vertical chases may be provided, a minimum of about 10' apart, extending the full height of the building and connecting the horizontal bulkheads on each floor; each chase measures approximately 2'×3' in plan, including framing, but may vary. The chases may connect mechanical, plumbing, electrical and data systems from floor to floor. The chases may extend through the roof like chimneys to allow for easy access to systems from the roof without compromising the roof waterproofing system. Changes to piping, exhaust, wiring, etc., may be easily accommodated without impacting the existing roof. One vertical chase may be dedicated to exhaust and venting, and the other chase may be dedicated to fresh air intake; the minimum of about 10' separation may provide adequate isolation of exhausts and air intake. In this way, all presently-known and most unknown future mechanical, plumbing, electrical, data/communication, and other services in the residence may be accommodated.

In one aspect, a method for providing a reconfigurable residential unit includes providing a first chassis comprising a fixed-width portion and a flexible-width portion, the fixed-width portion having a first side and a second side, providing at least one horizontal services bulkhead within the fixed-width portion and aligned along the first side of the fixed-width portion and configured to provide a passageway for one or more residential service systems, providing at least one vertical services distribution shaft within the fixed-width portion and aligned with the first side of the fixed-width portion and intersecting the at least one horizontal services bulkhead, the at least one vertical services distribution shaft configured to extend from a bottom floor to a top floor of the residential unit for distributing the one or more residential service systems to each floor of the residential unit, the at least one horizontal services bulkhead and the intersecting at least one vertical services distribution shaft together form at least one continuously-connected services distribution spine, providing a party wall along the second side of the fixed-width portion, the party wall adjacent to a second residential unit having a second chassis and providing a plurality of joists to support at least one floor system across the flexible-width portion, the plurality of joists extending horizontally from the at least one horizontal services distribution spine in an uninterrupted manner. The second chassis mirrors or is in parallel sequence to the first chassis. The step of providing at least one horizontal services bulkheads may include providing a plurality of horizontal services bulkheads and the step for providing at least one vertical services distribution shaft provides a plurality of vertical services distribution shafts. Each of the plurality of horizontal services bulkheads may intersect each of the plurality of vertical services distribution shafts. Each of the plurality of horizontal services distribution spines may extend from a first end of the residential unit to an opposite end of the unit. The plurality of horizontal services bulkheads and the plurality of vertical services distribution shafts may each distribute the one or more residential service systems to each floor of the residential unit. The one or more residential service systems may comprise a plurality of: a HVAC system, an electrical system, a plumbing system, a communication system. The one or more residential service systems may be accessible through each of the plurality of horizontal services bulkheads and the plurality of vertical services distribution shafts. The step of providing at least one vertical services distribution shaft may include providing at least one vertical services distribution shaft that extends to or through the roof of the residential unit and is accessible from the roof. The step of providing at least one horizontal services bulkhead may include providing a plurality of horizontal services bulkheads within the fixed-width portion creating a plurality of residential living spaces therebetween. The method may further comprise installing an elevator within one of the plurality of residential living spaces. The step of providing at least one horizontal services bulkhead within the fixed-width portion may create a space between the at least one horizontal services bulkhead and the party wall for a stairwell. The step of providing the plurality of joists to support at least one floor system may permit horizontal routing of the one or more residential service systems from the at least one horizontal services bulkhead into the flexible-width area. A reconfigurable residential unit may be constructed according to the above method.

In one aspect, a method for providing reconfigurable residential units includes providing a first chassis and a second chassis each comprising a fixed-width portion and a flexible-width portion, the fixed-width portion having a first side and a second side, the first and second chassis each with independent, adjacent party wall, providing a plurality of horizontal services bulkheads within each fixed-width portion aligned along each respective first side of the fixed-width portion and each of the plurality of horizontal services bulkheads configured to provide a passageway for one or more residential service systems, providing a plurality of vertical services distribution shafts within each fixed-width portion in which each vertical services distribution shaft intersects with the plurality of horizontal services bulkheads, each of the plurality of vertical services distribution shafts configured to extend from a first floor to a second floor of a respective one of the residential units for distributing the one or more residential service systems to each floor of the respective residential unit and providing a plurality of joists to support at least one floor system across a flexible-width portion of each residential unit, the plurality of joists extending horizontally from at least one of the plurality of horizontal services bulkhead in an uninterrupted manner. The plurality of horizontal services bulkheads and the plurality of vertical services distribution shafts may each distribute the one or more residential service systems to each floor of a respective residential unit. The one or more residential service systems may comprise a plurality of: a HVAC system, an electrical system, a plumbing system, a communication system.

In one aspect, a reconfigurable residential unit includes a first chassis comprising a fixed-width portion and a flexible-width portion, the fixed-width portion having a first side and a second side, at least one horizontal services bulkhead within the fixed-width portion and aligned along the first side and configured to provide a passageway for one or more residential service systems, at least one vertical services distribution shaft within the fixed-width portion and intersecting the at least one horizontal services bulkhead, the at least one vertical services distribution shaft configured to extend from a bottom floor to a top floor of the residential unit for distributing the one or more residential service systems to each floor of the residential unit, a party wall along the second side of the fixed-width portion, the party wall adjacent to a second residential unit having a second chassis and a plurality of joists to support at least one floor system across the flexible-width portion, the plurality of joists extending horizontally from the at least one horizontal services bulkhead in an uninterrupted manner. At least one horizontal services bulkhead may comprise a plurality of horizontal services bulkheads and the at least one vertical services distribution shaft comprises a plurality of vertical services distribution shafts, and each of the plurality of horizontal services bulkheads and each of the least one vertical services distribution shaft distribute the one or more residential service systems to each floor of the residential unit. The one or more residential service systems may comprise a plurality of: a HVAC system, an electrical system, a plumbing system, a communication system. The one or more residential service systems may be accessible through each of the plurality of horizontal services bulkheads and the plurality of vertical services distribution shafts.

BRIEF DESCRIPTION OF THE DRAWINGS

The accompanying drawings, which are included to provide a further understanding of the disclosure, are incorporated in and constitute a part of this specification, illustrate examples of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF THE DISCLOSURE

Figure 1:
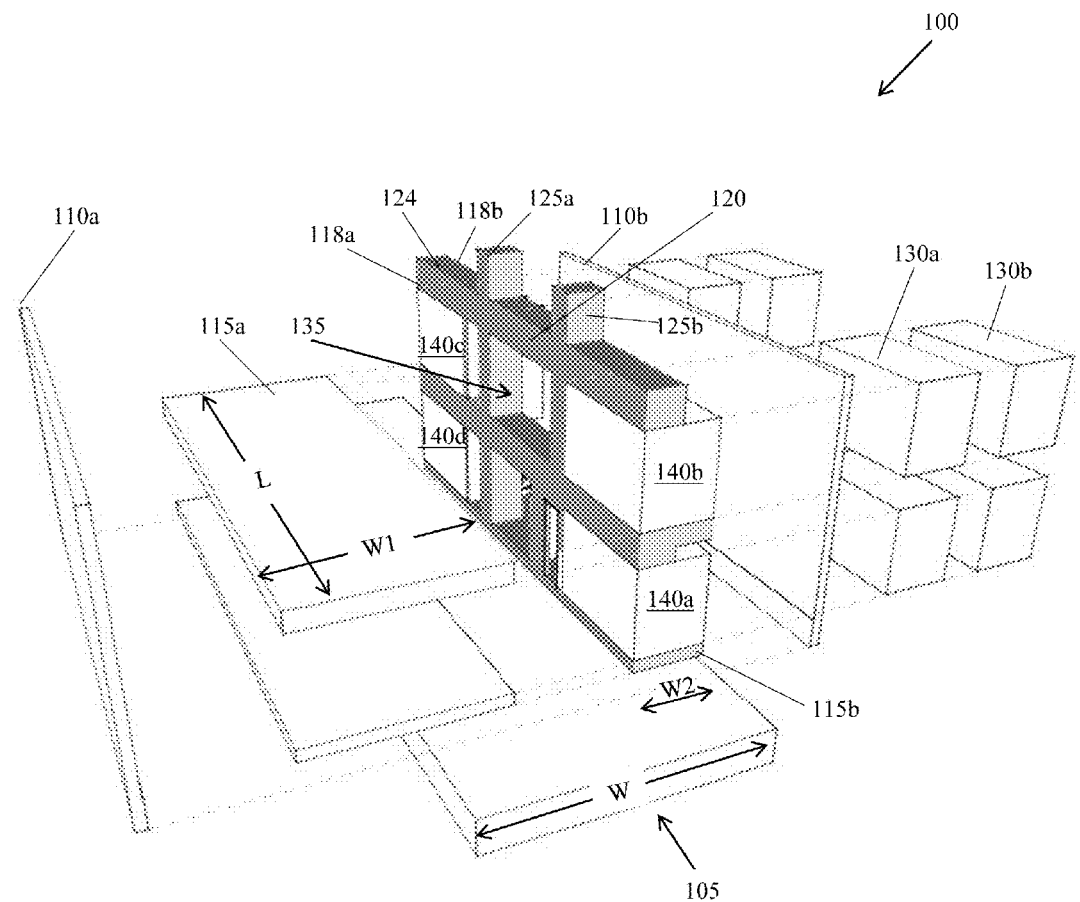
FIG. 1 is an exploded view illustrating an example of a schematic illustrating a structural system, configured according to principles of the disclosure.

The examples of the disclosure and the various features and advantageous details thereof are explained more fully with reference to the non-limiting examples that are described and/or illustrated in the accompanying drawings, and detailed in the following description. It should be noted that the features illustrated in the drawings are not necessarily drawn to scale, and features of one embodiment may be employed with other embodiments as anyone skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples herein should not be construed as limiting the scope of the disclosure, which is defined solely by the appended claims and applicable law. Moreover, it is noted that like reference numerals represent similar parts throughout the several views of the drawings. Noted dimensions described herein are exemplary.

The terms "a", "an", and "the", as used in this disclosure, means "one or more", unless expressly specified otherwise. The term rowhouse used herein may also encompass other residential type units.

Systems and methods are described herein for constructing buildings, such as new residential units, that allow for cost-effective site adaptation and easy upgradability and adaptability of the residence over time. The systems and methods described herein provide access to all components of all internal building systems after the construction of the building is complete. As such, the systems and methods described herein provide the ability to maintain, repair, upgrade, or replace entire internal building systems as a single-trade job. In addition, home space plans may be reconfigured due to the independence of walls from the internal building systems.

Due to rising demand for environmentally sustainable buildings, and due to the significant negative environmental impacts inherent in building construction and operations, the building design and construction industry is increasingly incorporating environmental sustainability best practices. These best practices are rapidly evolving, and a building built to meet sustainability standards today may not be considered sustainable in a few years. For this reason, the most important feature of a sustainable building may be "future-enabling," that is, the ability to more easily and more cost-effectively adapt to changing needs of its users and to adopt new sustainability techniques, technologies, and best practices over the life of the building. This disclosure includes description of five interwoven elements that work in concert to create a chassis that makes it possible to build "future-enabled" rowhouses and other related structures as described in this disclosure. These elements include: 1) A longitudinally-oriented connected services distribution spine; 2) Division of the structure into a "fixed-width zone" and a "flexible-width zone;" 3) Separation of structures along lot lines and/or unit demising walls; 4) Access to building services after initial completion and occupancy; and 5) Fixed-dimension rooms.

A longitudinally-oriented connected services distribution spine may comprise horizontal bulkheads at the ceiling plane on each floor, connected by two or more vertical shafts. The spine provides consolidated organization for all mechanical, plumbing, power, data, communications, and other building systems. The spine is typically sized to allow each system to occupy dedicated spaces within the bulkheads and shafts. The two or more vertical shafts may penetrate the roof plane, providing locations for supply and exhaust air and vents; providing for power and plumbing connections to roof top services such as solar power, solar thermal, rainwater capture, etc.; and allowing for future access to the spine from above the roof without violating the roofing or roof structure. The spine may be continuous the length of the structure, uninterrupted by vertical circulation such as stairs or elevators. The spine may include an internal beam line running longitudinally within the spine, with a post and beam structural frame that supports clear-span joists that span perpendicular to the spine, from the beam line to party walls and/or residential unit longitudinal exterior walls. The beams may be located within the bulkheads to allow services piping and ductwork to be routed into the bulkhead from both the fixed-width and flex-width zones without interruption. The beams allow for no interior load-bearing walls. Clear joist spans between the beam line and the party or lot line walls allow services to be routed in the spaces between joists for the full width of the fixed- and flex-width zones. Posts may be located outside the vertical services distribution shafts to eliminate conflicts with services routed within the shafts. Incorporation of the beam line increases the allowable clear-span width of the structure while maintaining clear access to both sides of the spine for building service piping and ductwork.

As shown in FIG. 1, the residential unit may be divided into a "fixed-width zone" W2 and a "flexible-width zone" W1 that allows for site-specific adaptation of the chassis to varying site widths while maintaining construction economies of scale. The spine may be situated within the fixed-width zone, immediately adjacent to the flexible-width zone. Vertical circulation, including stairs and elevators, may be located within the fixed-width zone between the spine and the adjacent party wall or longitudinal exterior wall, oriented parallel to the spine, or in the flex-width zone, oriented perpendicular to the spine so as to not interrupt the clear-span joists connecting services from the spine to the whole of the residence. Standard options may be offered for the width of the fixed-width zone (i.e., 6' wide, 8' wide, or 10' wide or the like), provided that the minimum with of the fixed-width zone is wide enough to allow for vertical circulation between the spine and the adjacent party wall or longitudinal exterior wall. The division into fixed-width and flex-width zones allows systems-intensive spaces and uses to be consolidated primarily in the fixed-width zone, which may provide construction economies of scale, by allowing engineered designs for spaces or rooms to be used in any home built with the matching standard fixed-width zone, while at the same time the flexible-width zones may allow residential units to be designed to fit lots of varying widths.

In typical contemporary construction, attached dwellings such as duplexes, triplexes and rowhouses/townhomes are built with a shared wall that straddles the property line or demising line and provides structural and fire resistance capacity. To maximize "future-enabling," a property-line or demising-line separation of structures may be provided. This may allow individual structures to be fully "fee simple," eliminating the requirement for an underlying co-op, condo, or HOA, although an HOA may still be provided if desired. Lot-line separation of structures may allow individual structures within a row of attached dwellings to be renovated or razed without compromising the structural integrity of fire-rated separation of neighboring residential units on shared property lines or demising lines.

Continuous access to building services during construction and after initial completion and occupancy may allow for single-trade repair or replacement of mechanical, plumbing, and/or electrical/data/communications systems. Means of access may include but are not limited to access ceilings at all services locations; removable access panels to the spine bulkheads and shafts; and power/data/communications raceways with removable covers, located along the top and bottom of interior walls. Continuous access may provide the ability for services to be maintained, upgraded and/or replaced over the life of the building, and also may streamline the construction process by allowing contractors to install services in any sequence, including after wall close-in inspections.

Fixed-dimension rooms may improve construction efficiency, and provide the ability to offer multiple possible solutions for programmed spaces within residential units. Within the parameters of the chassis, rooms may be designed within pre-determined three-dimensional fixed dimensions (length, width, and height) for use across all buildings built with this system. This may allow for efficiencies of scale: the most systems- and cost-intensive spaces may be designed with increased attention to functionality and cost effectiveness. Fixed-dimension rooms may be used in both fixed- and flex-width zones, with the dimensions of the rooms based on the constraints of fixed-width zones for maximum efficiencies of scale. When fixed-dimension rooms are installed flex-width zones, access ceilings and clear span joist bays may allow easy connection of all services to the spine.

According to principles of the present disclosure, a row-house floor plan (or similar residential unit) may be divided on long axis between "fixed-width" and "flexible-width" sections. The "fixed-width" section may include vertical circulation, mechanical, plumbing, electrical systems distribution, and systems-intensive rooms such as bathrooms, laundry rooms, wet bars, wine cellars, kitchens/kitchenettes, etc.; closets and small rooms; all of or some of which may be located in the fixed-width zone. Vertical circulation (e.g., staircases and elevator, if provided) may be located adjacent to the party wall. Mechanical and plumbing systems may be routed through a dedicated bulkhead that may be configured to run a length of the building, such as, e.g., from front to back; the bulkhead may be, e.g., about 3' wide by about 2'-6" tall, including framing, but can vary. Multiple fixed-width zone sizes may be developed for the chassis. For example, a 6' wide zone allows for the systems bulkhead plus a straight run stair only; an 8' wide zone allows for a straight run or "C"-shaped stair, and a 10' wide zone allows for a straight run, "C"-shaped or switchback stair (which also would make split-level homes possible with this system, provided that one of the two vertical chases (or shafts) aligns with the split in floor levels). To ensure continuity of the bulkhead, only one fixed-width zone may be applied to any given site.

A "flexible-width" section allows the building width to be adjusted at the time of initial construction to accommodate different lot widths (rowhouses or similar units may span the full width of the lot, from lot line to lot line). The ceiling in the flexible zone may be fully accessible to allow for access to wiring, plumbing, ductwork, and the like. Together, the "fixed-width" and "flexible-width" sections may create a chassis that can be adapted consistently to different site widths. Cost control may be maintained by concentrating systems-intensive rooms in the "fixed-width" zone immediately adjacent to the longitudinal bulkhead for shortest routing of systems piping, wiring, ducts, etc. The "fixed-width" zone provides a consistent predictable width, allowing for pre-design and cost evaluation for rooms/spaces in that zone that may be applied to all residential units constructed using the principles of the present disclosure.

Moreover, electrical and data wiring may be routed through raceways hidden behind a removable a wall base, a chair molding or paneling at the base of the wall, and may be accessible via crown molding raceways at the top of the wall. Two vertical chases may be provided, a minimum of about 10' apart, extending the full height of the building and connecting the horizontal bulkheads on each floor. Each chase may measure, e.g., approx. 2'×3' in plan, including framing, but can vary. The chases may connect mechanical, plumbing, electrical and data systems from floor to floor. The chases may extend through the roof like chimneys. Changes to piping, exhaust, wiring, etc., may be easily accommodated without compromising the integrity of the existing roof waterproofing system. One vertical chase may be dedicated to exhaust and venting, and the other chase may be dedicated to fresh air intake. The about 10' separation may provide adequate isolation of exhausts and air intake.

The fixed-width zones may allow for pre-determined blocks of space (e.g., 6'×6', 6'×8', 6'×10', 6'×12'), allowing for pre-design and cost evaluation for rooms/spaces in those blocks, for use across many different residence layouts or configurations. The blocks may provide cost control for on-site construction techniques, and are especially applicable to various forms of off-site ("modular" or "prefabricated") construction.

Structural and fire rating assembles in party walls along shared lot lines may be independent and not shared between adjacent rowhouses as is the case in typical rowhouse construction. For future-enabled rowhouses or similar residential units, a structural bearing wall with integrated fire protection may be used such as cross-laminated timber (CLT), with an air space at the property line, rather than the conventional construction in which the structural elements themselves are not fire rated; and the fire separation between rowhouses depends on a shared gypsum board shaft wall straddling both sides of the lot or building or unit demising line FIG. 1 is an exploded view illustrating an example of a schematic illustrating a structural system, configured according to principles of the disclosure. The example structural system 100 comprises a configurable building chassis and includes features that permit access to all internal building components/systems (e.g., plumbing, heat, ducts, wiring, and the like) after construction. An ability may be provided to maintain, repair, upgrade or replace entire internal building systems (e.g., plumbing supply and drains with gray water cycling) as single-trade jobs. Also, the internal space plans of the residence may be reconfigured due to independence of walls from the internal building components/systems.

As shown in FIG. 1, one or more horizontal services distribution spines 120 may be constructed to run horizontally along a length L of a residence, which typically is from one end of the residence to the opposite end. The one or more services distribution spines 120 may comprise horizontal bulkheads 124 and vertical services distribution shafts 125a, 125b, and may have a first side 118a and a second side 118b. The one more services distribution spines 120 may be configured and sized to provide a conduit passageway for one or more of multiple systems that may be required in a residence, including but not limited to electrical raceways, wiring, plumbing, communication wiring, heating and cooling ducts, and related equipment. Access to these one or more of multiple systems may be provided for easy access, replacement and/or repair. Within the services distribution spines 120, the one or more bulkheads 124 on each floor may be constructed to intersect one or more vertical services distribution shafts (or chases) 125a, 125b. The one or more vertical services distribution shafts 125a, 125b may be configured to extend from a bottom floor to a top floor, and perhaps onward through the roof. The site width W 105 of the residence may vary from one application to the next. As shown in FIGS. 1 and 2A-2C, a party wall (or firewall) 110a, 110b may separate one residence from another.

As shown in FIGS. 1 and 2A-2C, the intersecting one or more horizontal bulkheads 124 and the one or more vertical services distribution shafts 125a, 125b may be positioned spaced apart from one of the party walls 110a, 110b. The spacing may be about 3-4 feet from one another, but may vary (e.g., 6', 8', 10', 12'). The space 135 between the intersecting one or more bulkheads 124 and the one or more vertical services distribution shafts 125a, 125b in relation to the proximate party wall 110b permits stairways to be placed in the created space 135, proximate the side 118b of the one or more services distribution spines 120. The relationship of the intersecting one or more horizontal bulkheads 124 and the one or more vertical services distribution shafts 125a, 125b to the proximate party wall 110b is important in the system 100 because this permits joists 122a, 122b that support the floor system 115a, 115b to run uninterrupted across the width W. The length W1 of the joists 122a, 122b may vary for a particular application, but may be about 14', 16' 18', or any other length that an independently-spanned joist system may support in view of structural capacity and code. The joists 122a, 122b may be connected to beams 166 within the one or more services distribution spines 120.

Spaces 140a-140f may be created between layers of the one or more services distribution spines 120 for use as needed in the residences. As shown illustratively in FIG. 1, additional spaces 130a, 130b (similar to spaces 140a, 140b) may be provided as alternative functional options, providing for cost-effective personalization at the point of sale and easier future reconfiguration.

Figure 2:
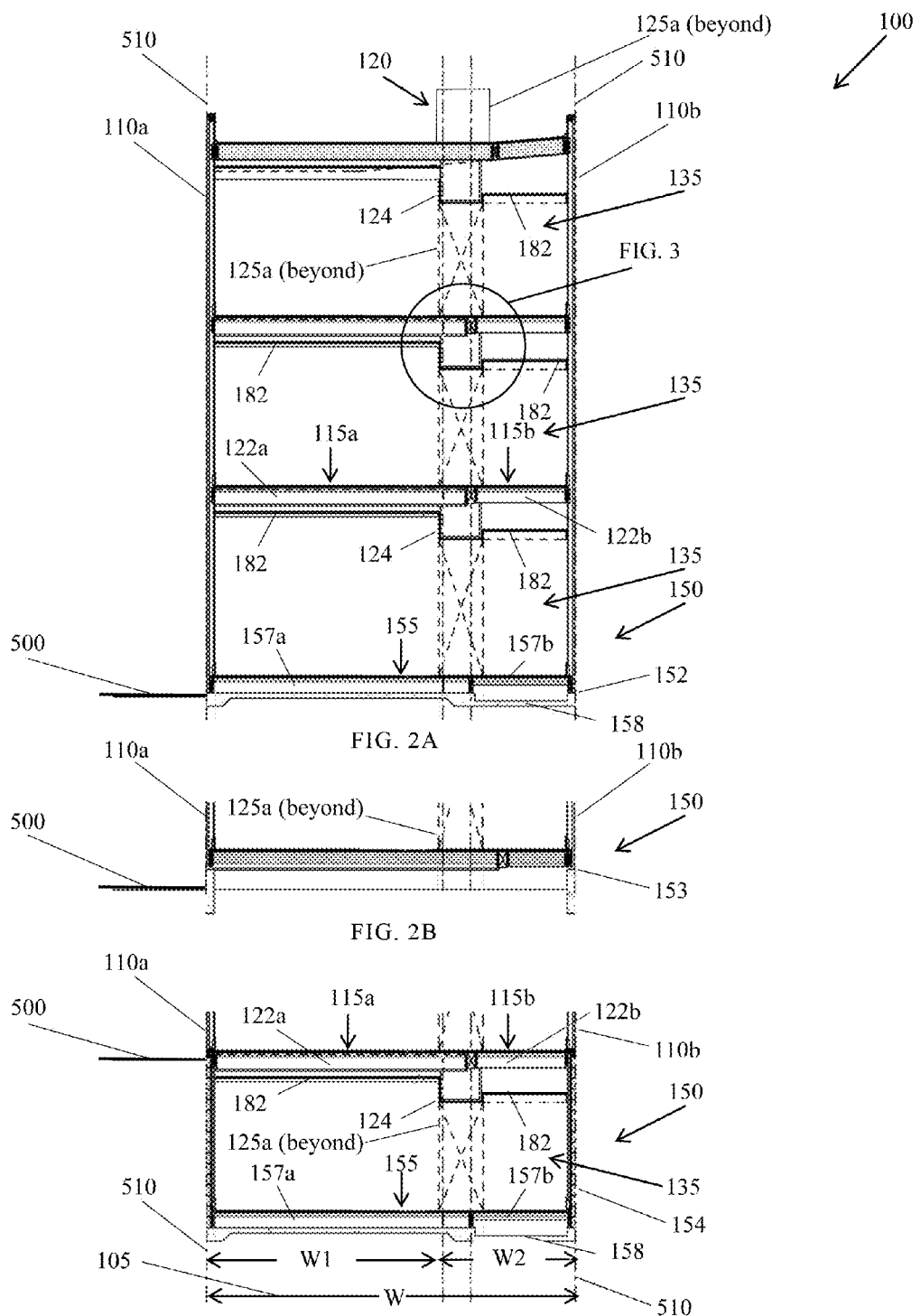
FIGS. 2A-2C are a cross-sectional view showing the relationship of party walls, one or more services distribution spines, joists, and one or more vertical services distribution shafts, configured according to principles of the disclosure.

FIG. 2 is a cross-sectional view showing the relationship of party walls 110a, 110b, one or more horizontal bulkheads 124, joists 122a, 122b, and one or more vertical services distribution shafts 125a, 125b, built on a foundation that may be: a concrete slab on grade foundation 152; a crawlspace/posts foundation 153; a full basement foundation 154; or any other foundation capable of supporting a structural system configured according to principles of the disclosure. The "fixed-width" zone may be e.g. 6'-0" in FIG. 2, as denoted by W2. The "flexible-width" zone may extend from the one or more services distribution spines 120, and may be e.g. 14'-0" in FIG. 2 as denoted by W1.

As shown in FIG. 2, foundation construction options supporting structural system 100 at exterior site grade 500 may include full basement 154; concrete slab on grade 152; crawlspace with foundation walls and/or elevated post footings 153, among others. In full basement 154 and concrete slab on grade 152 conditions, raised floor construction 155 may be provided to ensure that all services piping and air distribution ductwork remains within the building enclosure, above the concrete slab. Raised floor framing may comprise floor joists 157a, 157b, oriented in the same direction as the joists 122 in elevated floor, to provide uninterrupted services distribution across the width W1. Further, a slab depression 158 may be provided beneath the floor in the fixed-width zone to provide additional space for drainage routing. In this manner, future alterations to sub-floor ductwork, floor drainage plumbing and other services piping may be made without requiring expensive and wasteful cutting, patching and excavation of the concrete slab, reducing costs of alterations and eliminating the risk of compromising under-slab drainage, hydrostatic pressure, pest control, and soil gas protection systems. Additional benefits may include increased thermal performance of the grade-level floor system, reduction in the potential for mold growth, and the ability to install hardwood or similar floor finishes without limitation.

Figure 3:
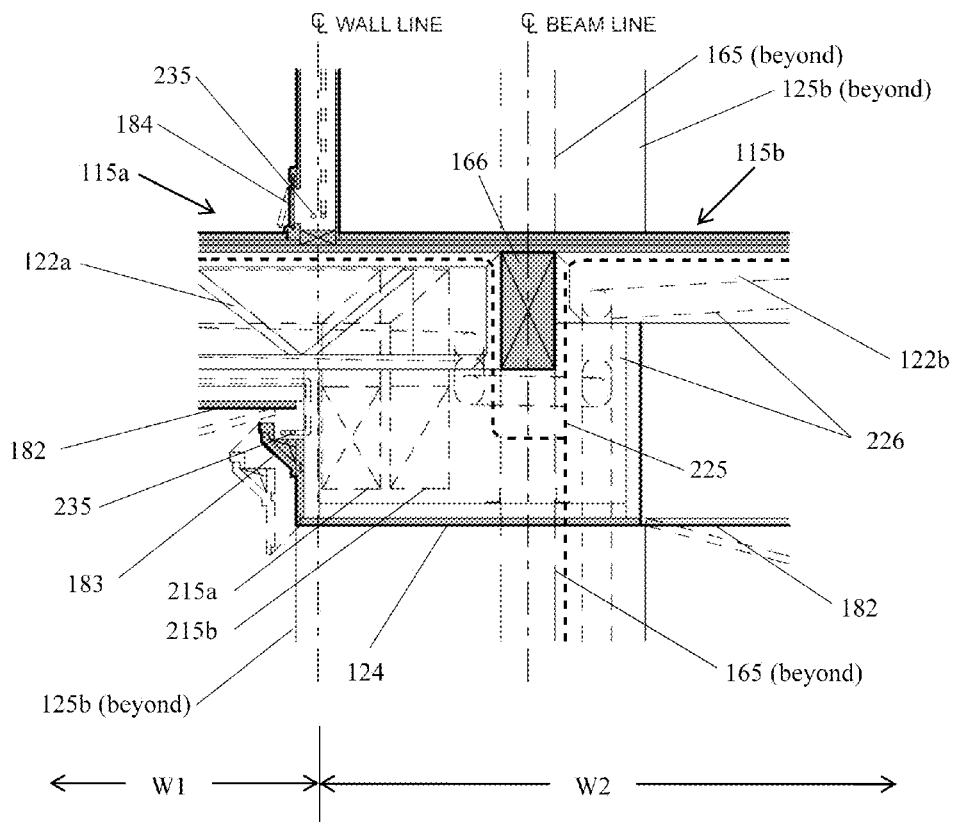
FIG. 3 is an example close-up of the indicated detail section of FIG. 2A.

FIG. 3 is an example of the indicated detail section of FIG. 2, showing possible configurations, features, and systems of the one more horizontal bulkheads 124 and one or more vertical shafts 125a, 125b. For example, as shown in FIG. 3, plumbing supply 225, drain systems 226, HVAC (heating, ventilation, and air conditioning) air supply ducts 215a and return ducts 215b, and/or power and data wiring 235 may be supported therewithin. Also, plenum rated power and data wiring may be concealed. HVAC distribution may be included in the one more horizontal bulkheads 124 and/or one or more vertical shafts 125a, 125b. One or more removable panels may be configured on the one or more horizontal bulkheads 124 and/or one or more vertical shafts 125a, 125b for access to the components and systems therewithin. Power and data wiring 235 may be located behind removable wall bases 184 and/or removable or accessible crown moldings 183. Removable access ceilings 182 may be provided for some or all of the clear span joist bays 122a, 122b.

Figure 4A:
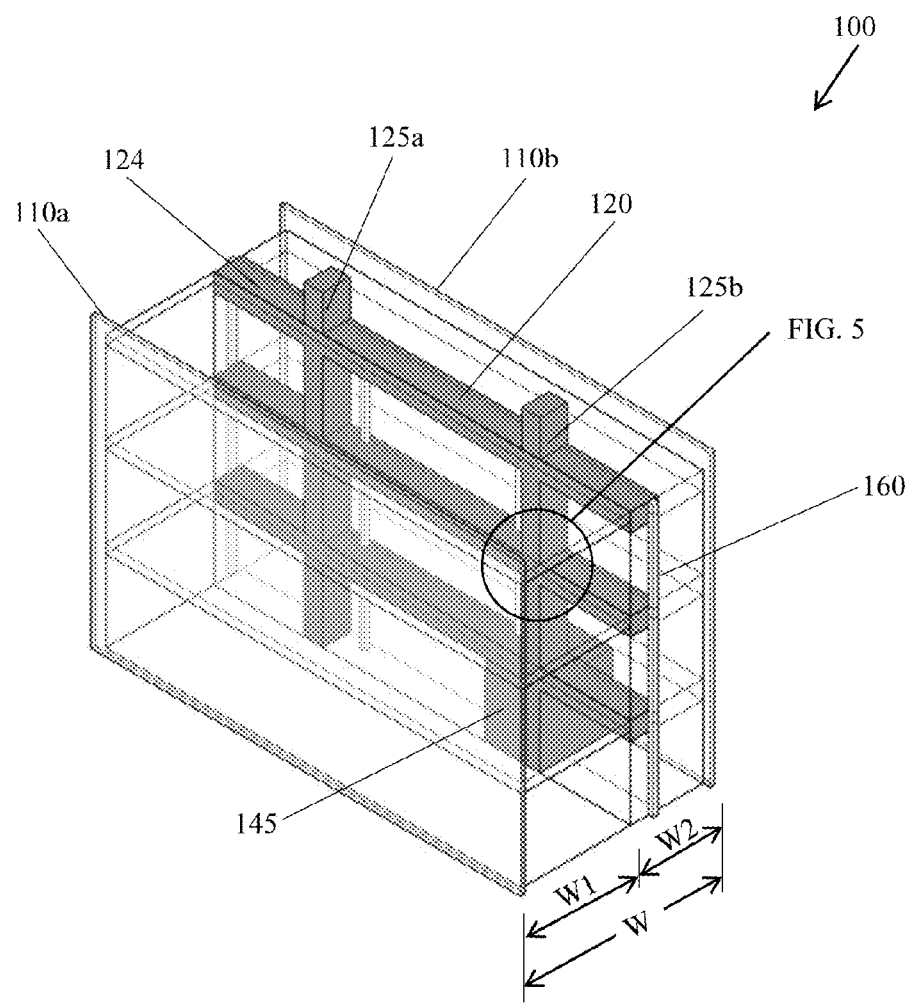
FIG. 4A is an example isometric diagram illustrating a single residential unit, showing a possible location of the spine in relation to the flexible-width zone W1 and the fixed-width zone W2, configured according to principles of the disclosure.

FIG. 4A is an example isometric diagram illustrating a single residential unit, showing a possible location of the spine 120 in relation to the flexible-width zone W1 and the fixed-width zone W2, configured according to principles of the disclosure. The spine 120 comprises one or more vertical services distribution shafts 125a, 125b connected by one or more horizontal bulkheads 124. Vertical shafts 125a, 125b may be separated by a minimum of 10' or as required to meet minimum separation of fresh air intake from exhaust air as may be required by code. One or more of the vertical shafts 125a, 125b may be connected to one or more utility rooms 145 to provide continuous distribution of mechanical, plumbing, electrical, data and other services from equipment to fixture.

Figure 4B:
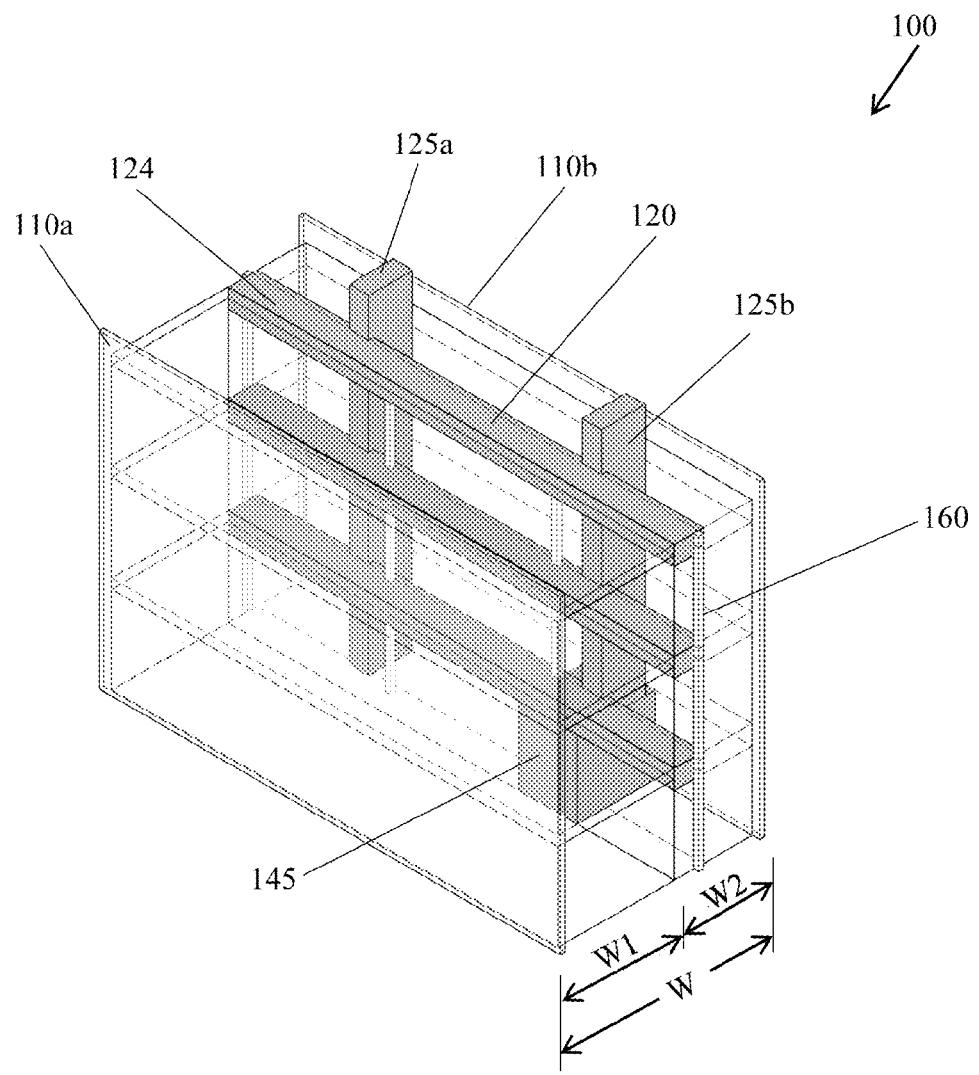
FIG. 4B is an example isometric drawing that illustrates an alternative possible configuration of the vertical shafts relative to the horizontal bulkheads in the spine within the fixed-width zone W2.

FIG. 4B is an example isometric drawing that illustrates an alternative possible configuration of the one or more vertical shafts 125a, 125b relative to the one or more horizontal bulkheads 124 within the fixed-width zone W2. In this configuration, the one or more vertical shafts 125a, 125b may be located within the fixed-width zone between the one or more bulkheads 124 and the party wall 110b, immediately adjacent to and connected to the one or more bulkheads 124. The width of the one or more vertical shafts 125a, 125b may be wider than the width of the horizontal bulkheads 124 and e.g. may be as wide as the fixed-width zone W2. When more than one vertical shaft 25a, 25b is provided, each shaft may be configured as illustrated either in FIG. 4A or in FIG. 4B. (For the purpose of clarity, all other Figures in this disclosure follow the example illustrated in FIG. 4A.)

Figure 5:
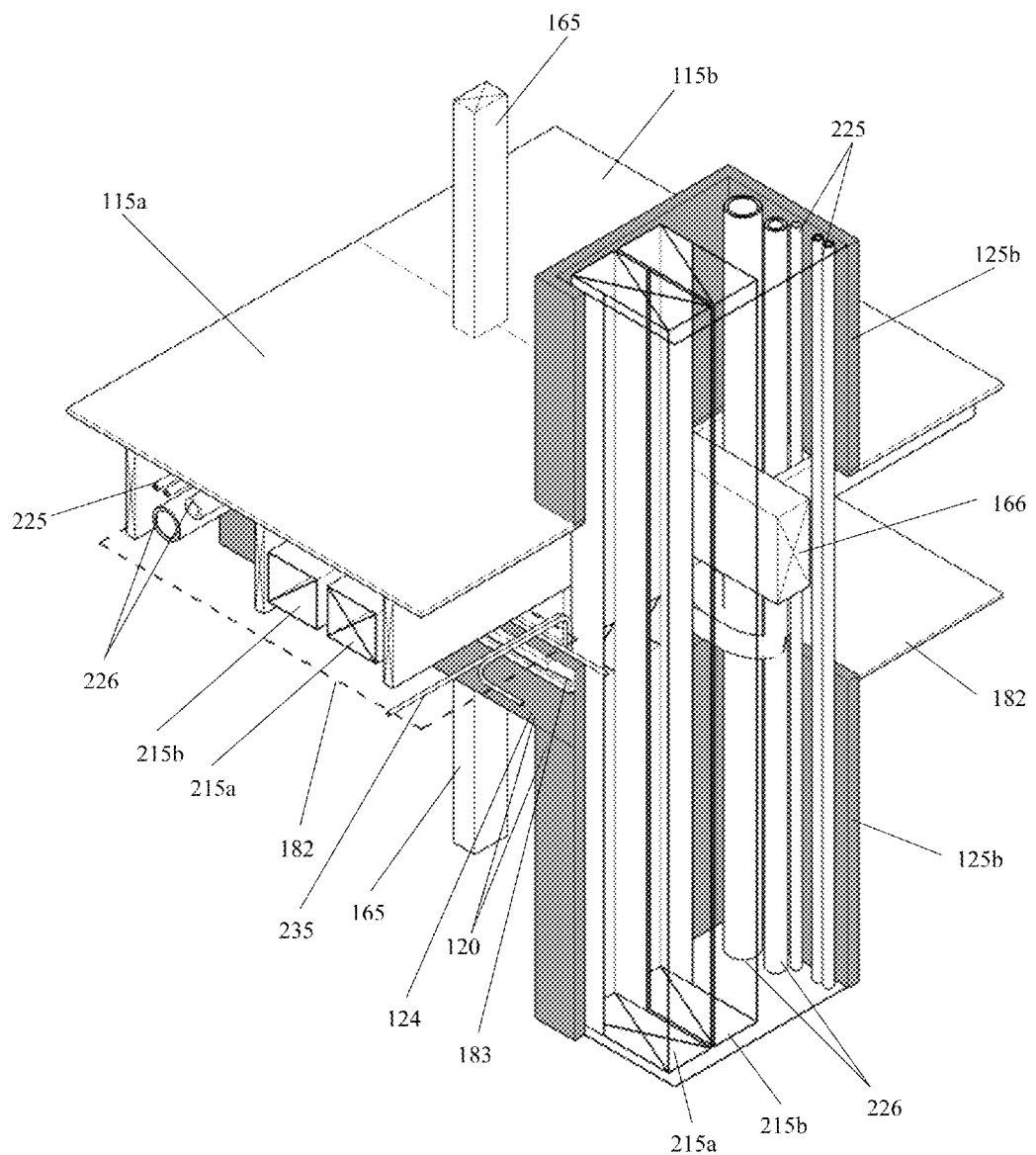
FIG. 5 is an example isometric cutaway detail drawing of FIG. 4 illustrating the one or more services distribution spines 120 at the location where horizontal bulkhead and vertical shaft intersect, showing possible configurations, features, and systems therewithin, configured according to principles of the disclosure.

FIG. 5 is an example isometric cutaway detail drawing of FIG. 4 illustrating the one or more services distribution spines 120 at the location where horizontal bulkhead 124 and vertical shaft 125a, 125b intersect, showing possible configurations, features, and systems therewithin, configured according to principles of the disclosure. For example, as shown in FIG. 5, mechanical, plumbing, and power and data services as identified in FIG. 3 may be routed vertically through the one or more vertical shafts 125a, 125b, then branch horizontally in a longitudinal direction within the one or more bulkheads 124, then route horizontally in a transverse direction within the bays of the clear span joists 122a, 122b in the floor systems 115a, 115b to provide services to all areas of the residential unit. One or more removable panels may be configured on the one or more horizontal bulkheads 124 and/or one or more vertical shafts 125a, 125b for access to components therewithin after the completion of initial construction. Access ceilings 182 may be provided below the clear span joists for access to the components and systems therewithin throughout the residential unit.

Figure 6:
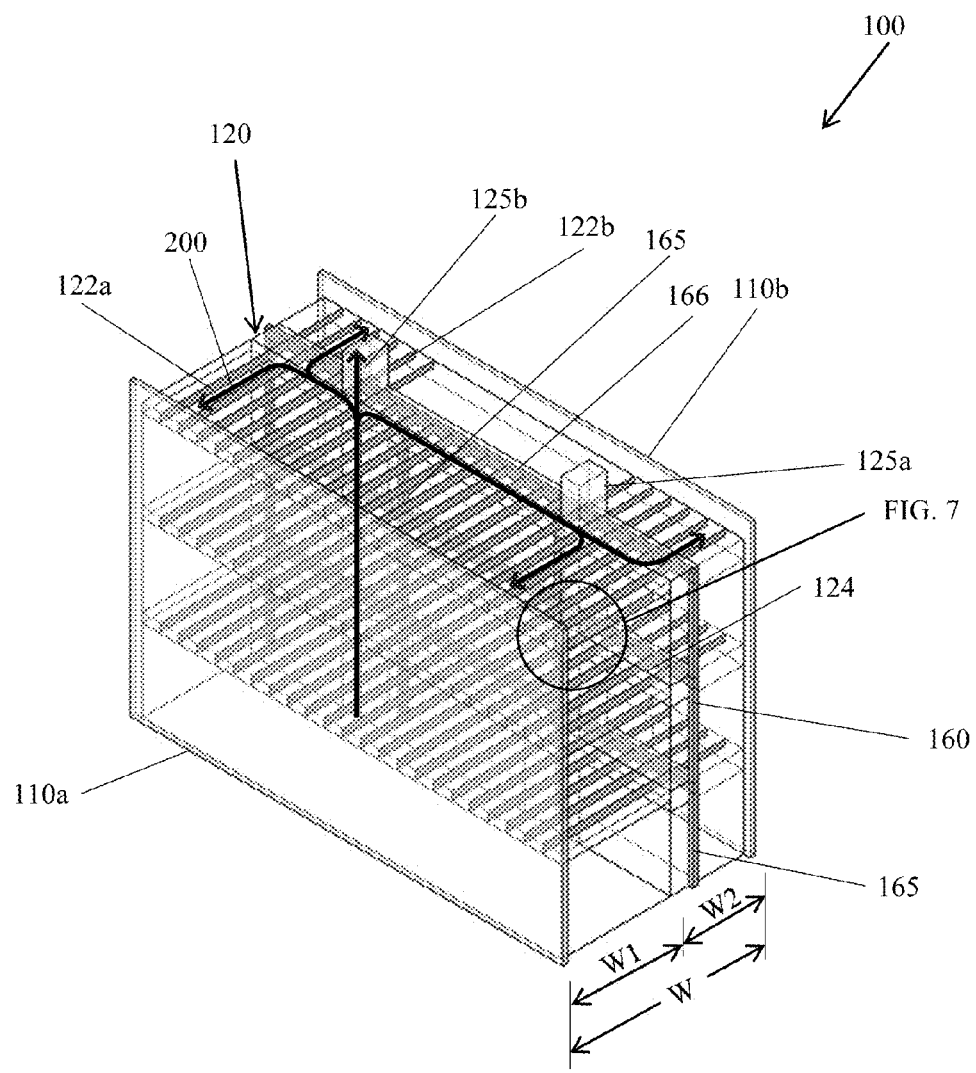
FIG. 6 is an example isometric diagram illustrating a load-bearing structural system that may be incorporated in a single reconfigurable residential unit, configured according to principles of the disclosure.

FIG. 6 is an example isometric diagram illustrating a load-bearing structural system that may be incorporated in a single reconfigurable residential unit, configured according to principles of the disclosure. One or more post-and-beam frames 160 may be located on a beam line within the one or more services distribution spines 120. Floor joists 122a, 122b may clear span from the beams 166 to party walls or longitudinal exterior walls 110a, 110b. Beams 166 may be oriented longitudinally in the residential unit, within the bulkhead 124 to allow mechanical, plumbing, electrical, data, and other services to enter the horizontal bulkheads 124 from the clear span floor joists 122a, 122b from either the flex-width W1 or fixed-width W2 side of the spine 120. The one or more posts 165 may be located outside of the one or more vertical shafts 125a, 125b to maximize the amount of space available within the vertical shafts 125a, 125b for services distribution. An example services distribution routing path 200 shows how the relationship described between the post-and-beam frame 160, spine 120, clear span joists 122a, 122b and party or longitudinal exterior walls 110a, 110b may allow services to be distributed throughout the residential unit completely within the spine 120 and clear span joist bays.

Figure 7:
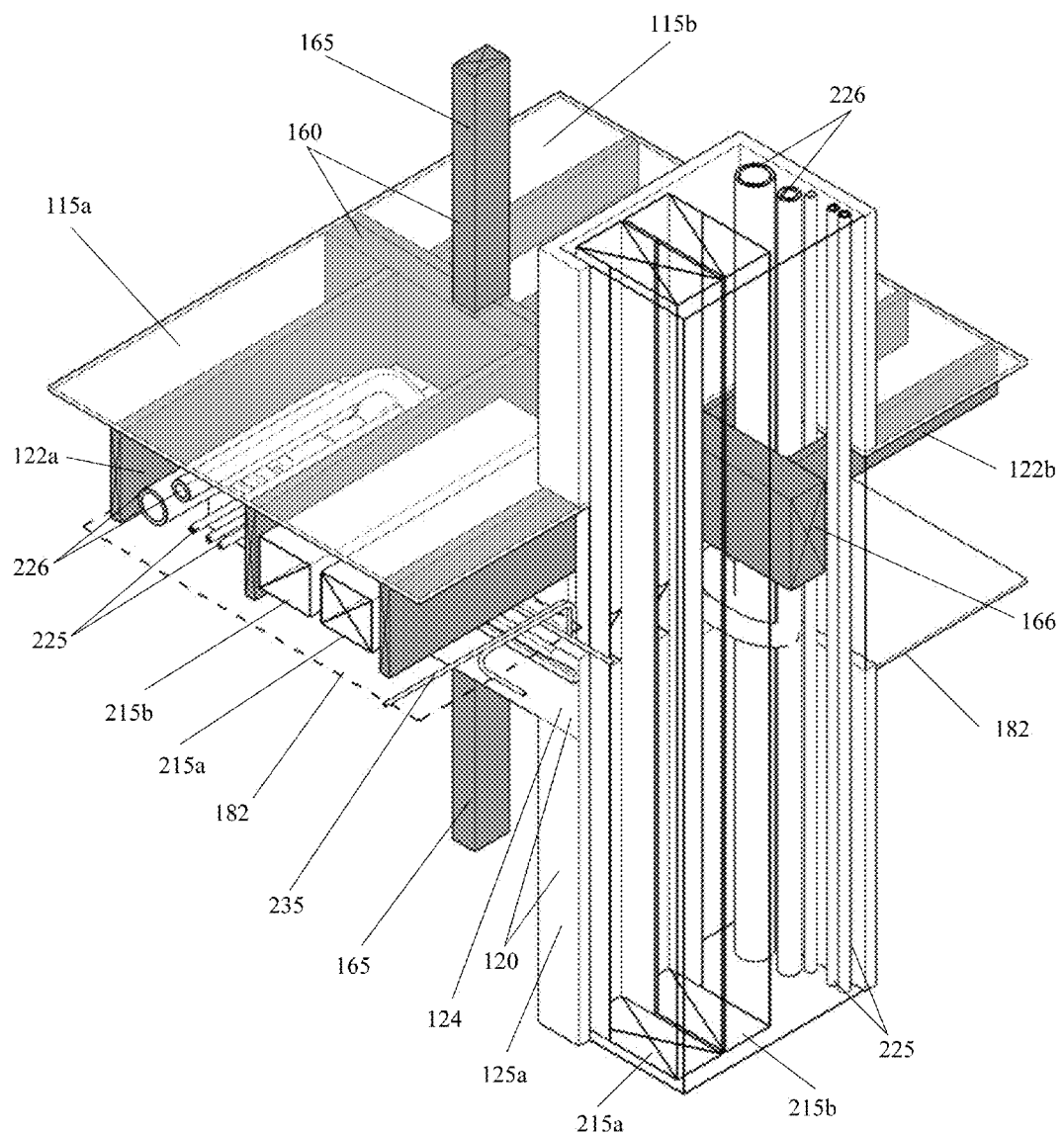
FIG. 7 is an example isometric cutaway detail drawing of FIG. 6, illustrating the one or more services distribution spines at the location where horizontal bulkhead x4 and vertical shaft intersect, showing the relative locations of the components of the post-and-beam frame relative to the one or more spines, configured according to principles of the disclosure.

FIG. 7 is an example isometric cutaway detail drawing of FIG. 6, illustrating the one or more services distribution spines 120 at the location where horizontal bulkhead 124 and vertical shaft 125a, 125b intersect, showing the relative locations of the components of the post-and-beam frame relative to the one or more spines 120, configured according to principles of the disclosure. The one or more beams 166 may be located within the one or more bulkheads 124 so that services may connect from joist bays to the spine from either side 118a, 118b without interruption. The one or more posts 165 may be located outside of the vertical shafts 125a, 125b to eliminate possible conflicts with services distribution. The floor joists 122a, 122b in floor systems 115a, 115b may be connected flush to the top of the one or more beams 166 to keep the one or more beams 166 high in the one or more horizontal bulkheads 124, out of the way of the routing of services distribution.

Figure 8:
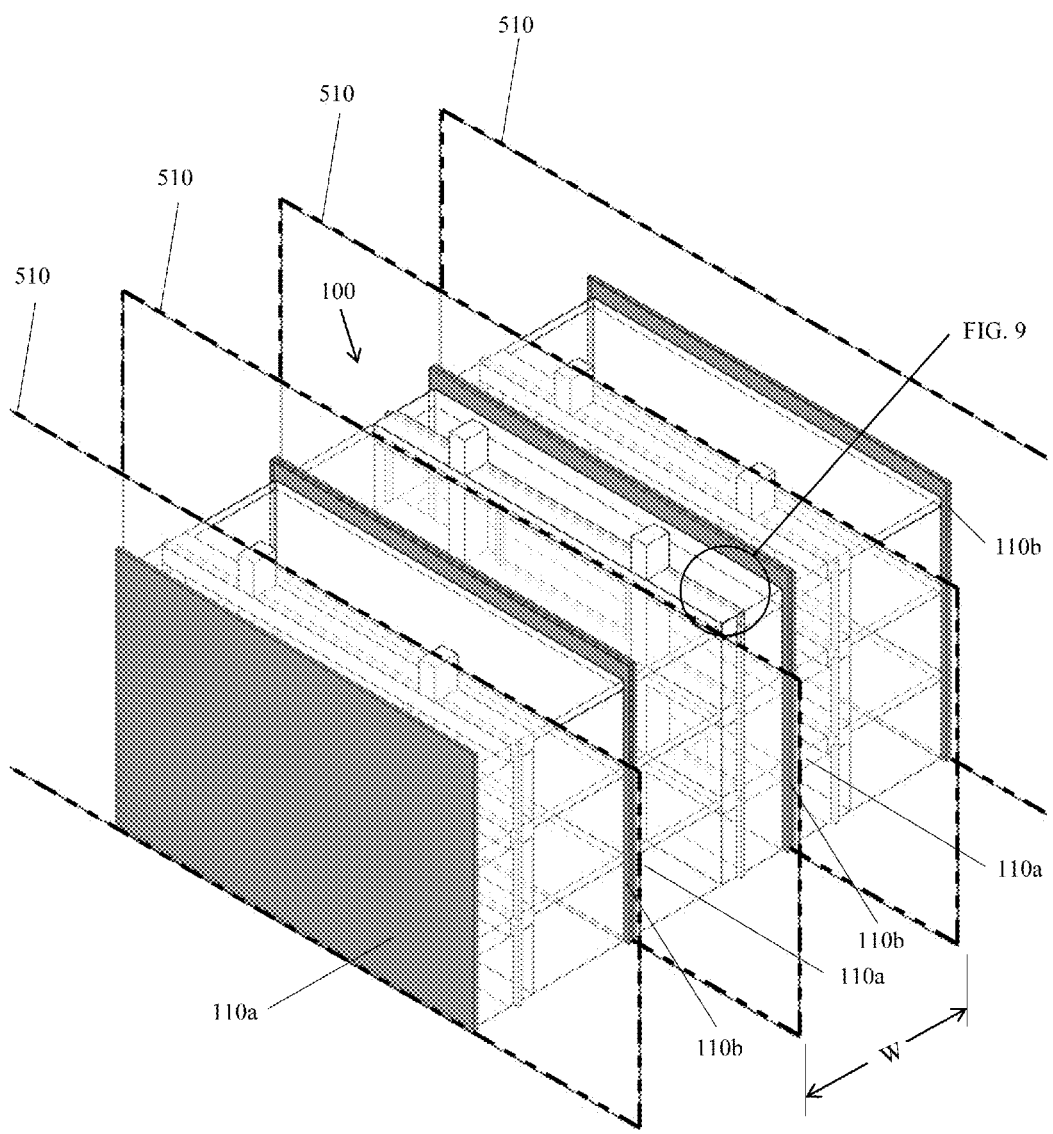
FIG. 8 is an example isometric diagram illustrating three adjacent residential units showing structurally isolated party walls for each unit at shared property lines or unit demising lines 510, with independent fire rating provided for each residential unit on each side of the property line or unit demising line, configured according to principles of the disclosure.

FIG. 8 is an example isometric diagram illustrating three adjacent residential units showing structurally isolated party walls 110a, 110b for each unit at shared property lines or unit demising lines 510, with independent fire rating provided for each residential unit on each side of the property line or unit demising line 510, configured according to principles of the disclosure. Providing independent structural party walls and code-required fire rating for each residential unit in an attached row may allow individual units within the row to be structurally modified or even demolished without affecting adjacent residential units. The current standard practice is to provide shared fire-rated party walls, using a shaft wall construction that straddles the property line, which may bind the fate of one unit to adjacent units. Providing independent structural party walls and fire rating may also allow row dwellings to be truly fee-simple, rather than subject to an underlying condominium or homeowner's association as may be required when party walls are shared ownership between or among adjacent units. Fee-simple ownership may increase "future-enabling" by increasing the residential unit owners' freedom to modify the residential unit to meet changing needs as desired.

Figure 9:
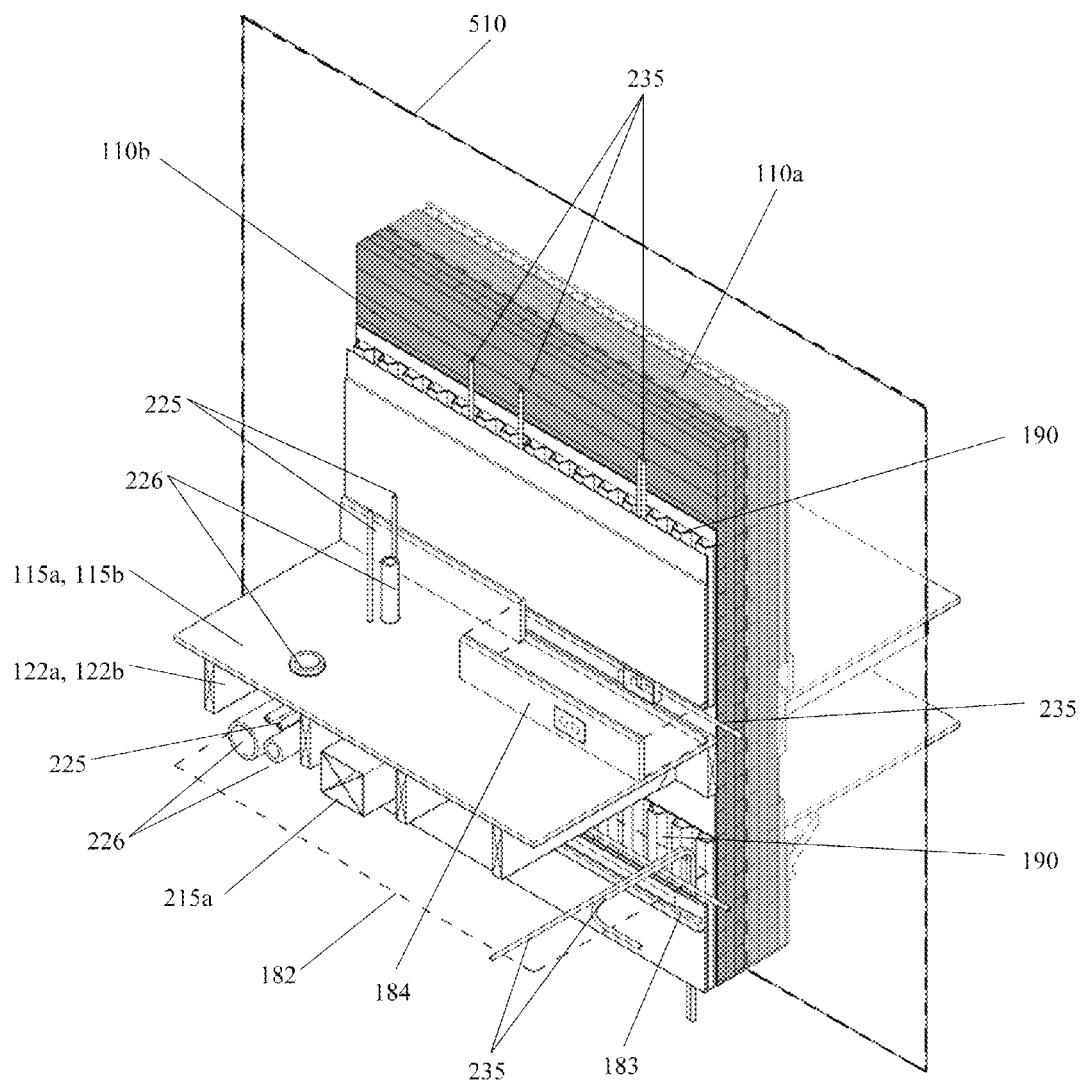
FIG. 9 is an example isometric cutaway detail drawing of FIG. 8 illustrating structurally isolated party walls 110a, 110b at a shared property line or unit demising line 510, configured according to principles of the disclosure.

FIG. 9 is an example isometric cutaway detail drawing of FIG. 8 illustrating structurally isolated party walls 110a, 110b at a shared property line or unit demising line 510, configured according to principles of the disclosure. As shown in FIG. 9, each residential unit may be provided with its own individual fire rated structural party wall 110a, 110b. Interior to the party wall, a furred out cavity wall 190 may be provided for routing of mechanical, plumbing, electrical, data, and other services, for example power and/or data wiring 235. Power and data wiring 235 may be located behind removable wall bases 184 and/or crown moldings 183. Plumbing distribution piping 225, 226 and HVAC ductwork 215a, 215b may be extended to interior spaces adjacent to the party walls 110a, 110b through the clear span joist bays 122a, 122b that provide continuous services distribution paths to the spine. Removable access ceilings 182 may be provided at some or all floor systems 115a, 115b.

Figure 10:
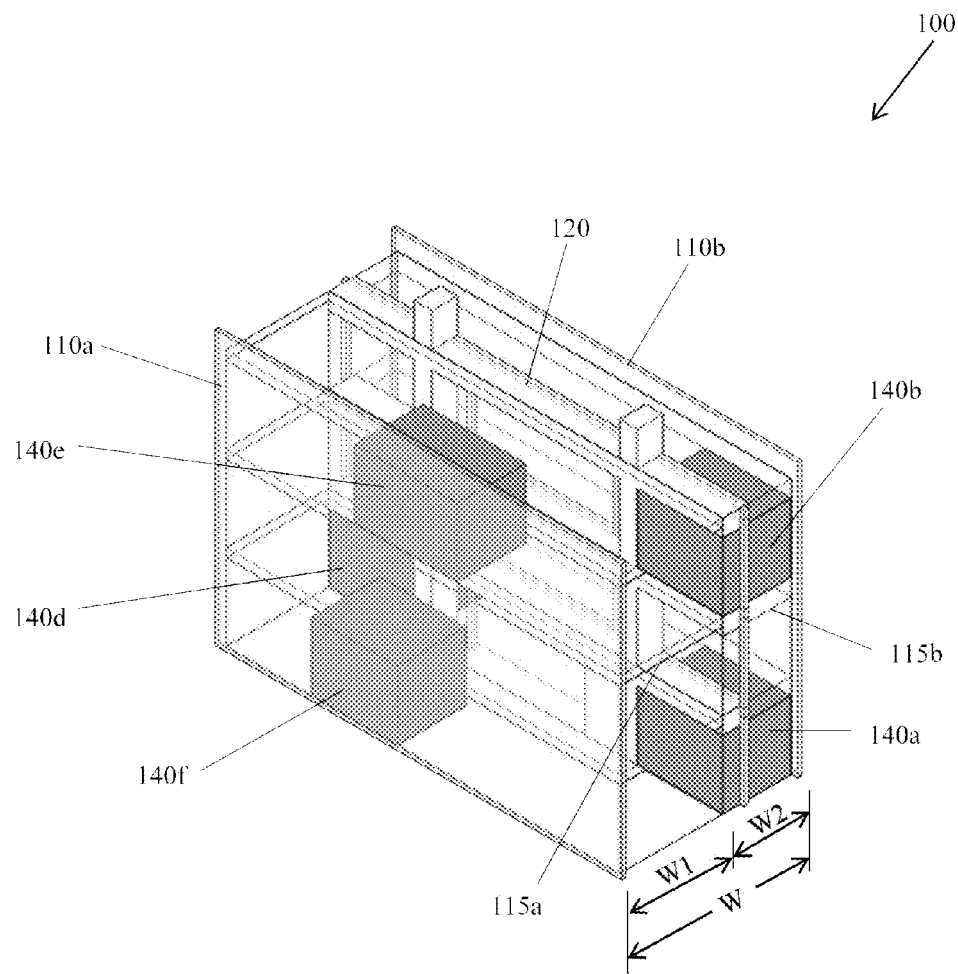
FIG. 10 is an example isometric diagram of a single residential unit, illustrating some potential locations for fixed-dimension rooms 140a through 140f, configured according to principles of the disclosure.

FIG. 10 is an example isometric diagram of a single residential unit, illustrating some potential locations for fixed-dimension rooms 140a through 140f, configured according to principles of the disclosure. During the design phase, un-programmed spaces or zones may be planned with fixed dimensions W×L, based on the width of the fixed-width zones and pre-determined lengths in the longitudinal direction. These un-programmed spaces may allow for multiple different fixed-dimension room designs to be provided as options for each planned space. Fixed-dimension rooms 140a through 140f may be provided in the fixed-width zone W2 and also may be provided in the flex-width zone W1. When provided in the flex-width zone W1, fixed-dimension rooms 140a through 140f may be located tight to the party wall 110a, and in this manner may be able to maintain economies of scale by creating consistent, predictable relationships while allowing the design of the residence to be adapted to varying site widths by adapting the width of the flex-width zone W1. Mechanical, plumbing, electrical, data, and other services provided to fixed-dimension rooms 140a through 140f located in the flex-width zone W1 may be routed through the clear-span joist bays in the floor system 115a, and may be accessible during initial installation and during periods of occupancy after initial construction via access ceilings 182. In addition to creating the opportunity to provide a wider range of interior space configuration options for prospective buyers and/or residents, the use of fixed-dimension rooms may effectively turn each room design into a product that may be incorporated into many configurations of reconfigurable residential unit designs. This in turn may create the opportunity for economies of scale across multiple projects, and may also allow for iterative improvements to the design of the fixed-dimension rooms 140a through 140f over time based on user feedback and continuing design refinement. In this way, innovation in home design using this chassis system may be more similar to automotive design and manufacturing than conventional home design, in that over time increasing levels of quality and and design sophistication may be achieved while maintaining or reducing initial cost.

Figure 11:
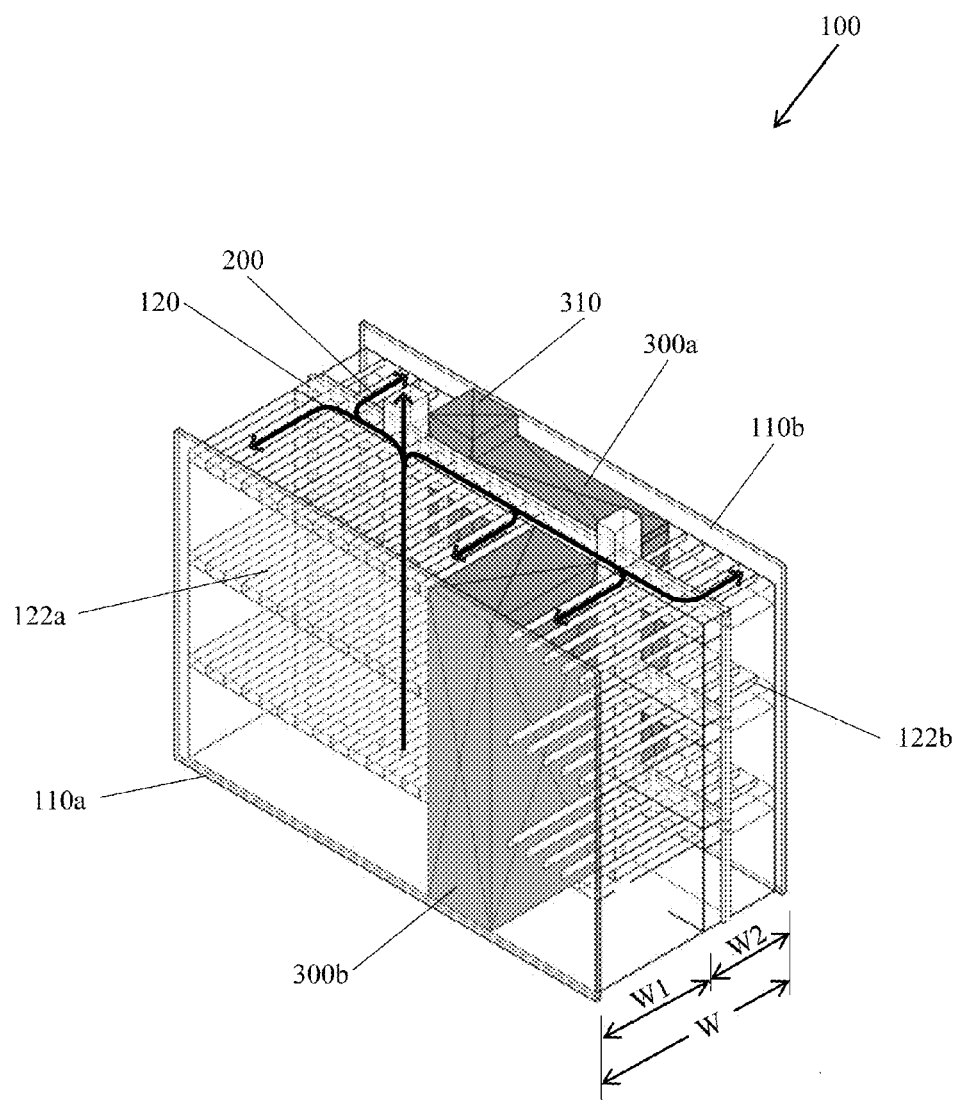
FIG. 11 is an example isometric diagram of a residential unit illustrating two potential location options for vertical circulation 300a, 300b such as stairs and/or elevators and the like, configured according to principles of the disclosure.
Figure 12A:
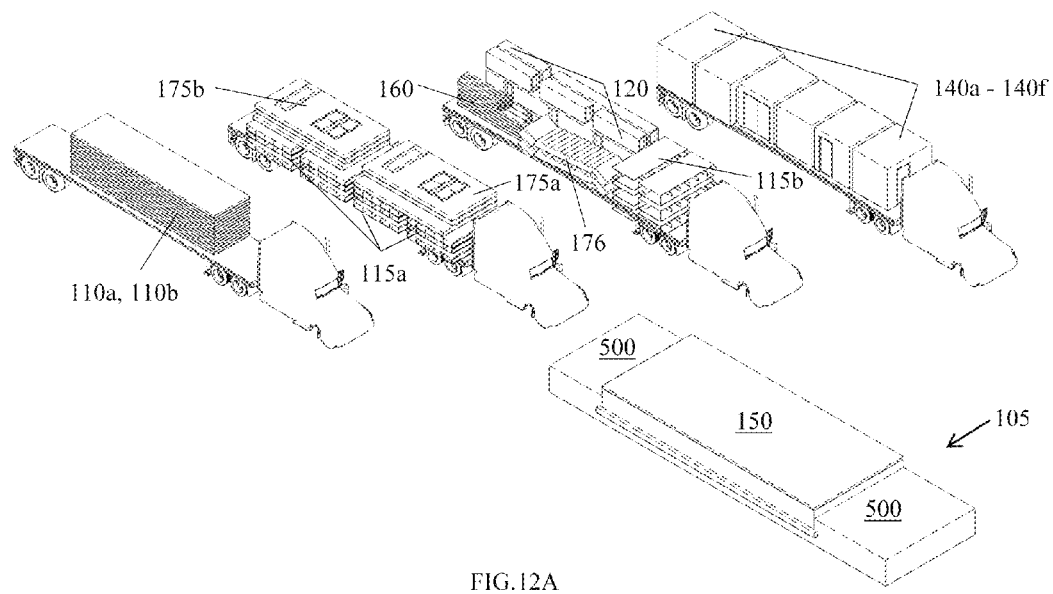
FIGS. 12A and 12B illustrate an example fabrication philosophy that may be used to maximize economies of scale while minimizing shipping waste, according to principles of the disclosure.
Figure 12B:
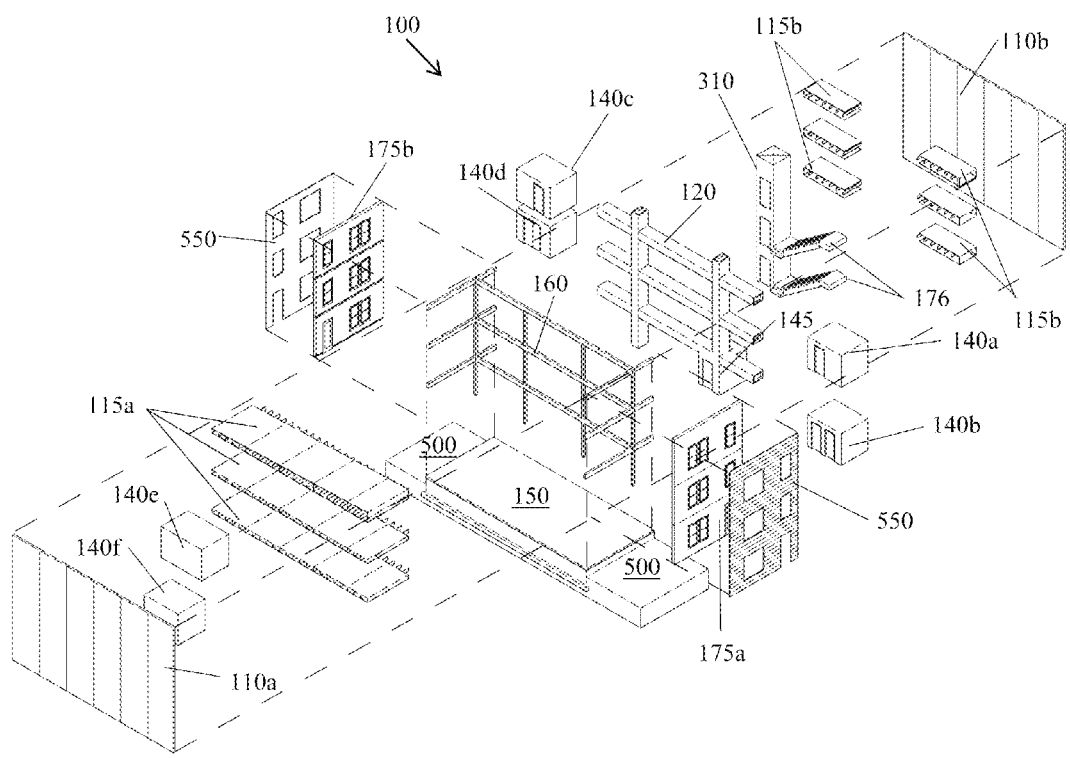

FIG. 11 is an example isometric diagram of a residential unit illustrating two potential location options for vertical circulation 300a, 300b such as stairs and/or elevators and the like, configured according to principles of the disclosure. Vertical circulation 300b may be located within the flex-width zone W1 parallel to the clear-span joists 122a and perpendicular to the spine 120 and located between the spine 120 and the party wall 110a. Alternatively or in addition, vertical circulation 300a may be locate within the fixed-width zone, parallel to the spine 120 and located between the spine 120 and the party wall 110b. In this manner, mechanical, plumbing, electrical, data, and other services may be distributed without interruption along a path, e.g. 200, through the bays in the clear span joists 122a and 122b to all interior spaces of the residential unit. Elevator shafts 310 may be provided in either vertical circulation configuration 300a or 300b FIGS. 12A and 12B illustrate an example fabrication philosophy that may be used to maximize economies of scale while minimizing shipping waste, according to principles of the disclosure. FIG. 12A is an example isometric drawing illustrating the structure 100 for one residential unit packaged on flatbed trucks for shipping. FIG. 12B is an example exploded isometric drawing illustrating a range of potential off-site fabricated and on-site fabricated components as they may be installed to create a single residential unit. Structures built according to the principles of the disclosure may be fabricated on-site, e.g. built completely on the exterior site grade 500, or portions of the structure may be fabricated off-site in components or modules and delivered to the prepared site for assembly. As shown in FIGS. 12A and 12B, the elements of the structure may be assembled into components and sub-modules that are optimized for shipping, value add, and ease of assembly, with an emphasis on minimizing the volume of air, or wasted shipping volume, shipped. For example, some elements may be assembled in "modules," some may be "panelized," some may be partially assembled in "components," some pieces may be "pre-cut" for easy assembly, and some elements may be built conventionally in the field. "Modules" may include services-intensive and finishes-intensive spaces such as bathrooms and kitchens 140a through 140f. "Panelized" assemblies may include fire-rated party walls 110a and 110b; floor/ceiling assemblies 115a (flex-width zone) and 115b (fixed-width zone); elevator shaft walls 310; interior partitions, which may include power/data raceways; and front and rear walls 175a, 175b, which may include exterior sheathing, insulation, interior sheathing, doors and windows, weather sealing, and power/data raceways. "Components" may include stairs 176, millwork and cabinetry (not shown, for clarity), packaged mechanical and plumbing systems, and pre-assembled portions of the spine 120. "Pre-cut" elements may include post and beam structures 160. Field fabricated elements may include foundation 150, exterior detailing and finishes 550, interior detailing and finishes, and all or portions of the mechanical, electrical and power/data distribution systems (not shown, for clarity).

Figure 13A:
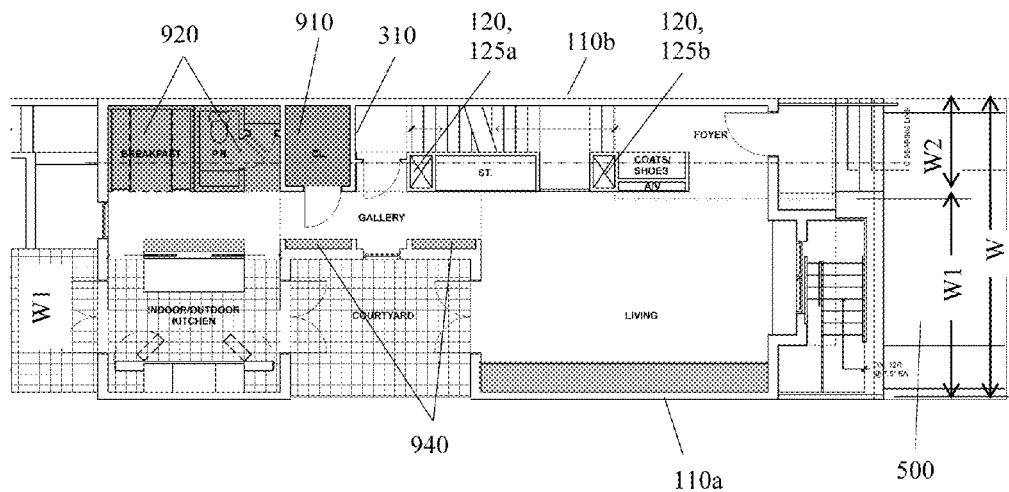
FIGS. 13A and 13B are example ground floor plans illustrating a case study of one way the future-enabled aspects of the disclosure may be put to use for upgrades to a residential unit to accommodate aging-in-place, configured according to principles of the disclosure.
Figure 13B:
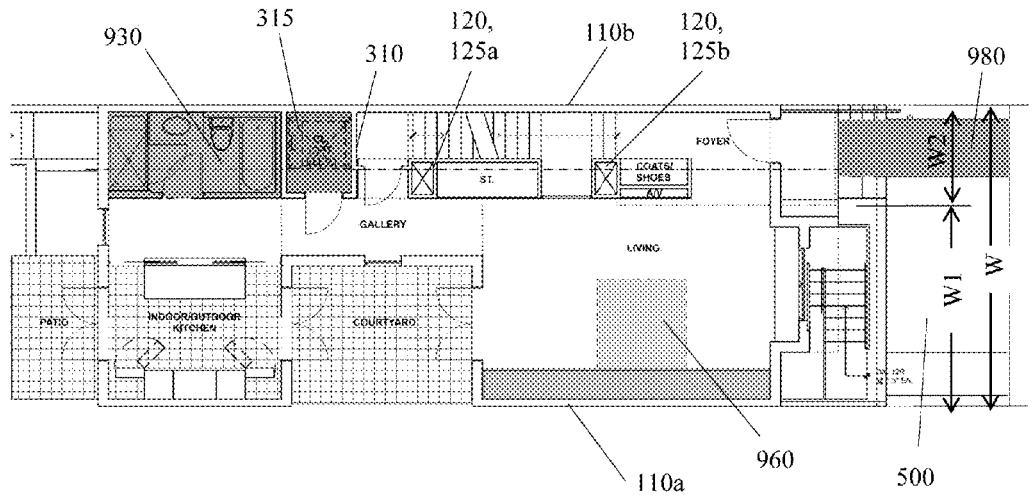

FIGS. 13A and 13B are example ground floor plans illustrating a case study of one way the "future-enabled" aspects may be put to use for upgrades to a residential unit to accommodate aging-in-place, configured according to principles of the disclosure. Reconfigurable residential units may be designed to anticipate potential needs of residents aging in place over time. Changes in peoples' physical mobility due to aging are typically not gradual and often occur abruptly and due to unexpected events, such as suffering a fall or a stroke. At the time of a sudden change in a person's mobility, current residences built using conventional "locked in" construction methods can be rendered unusable unless costly and lengthy capital improvements are undertaken. Residential units configured according to the principles of the disclosure may make it easier for residents faced with abrupt changes in mobility to maintain use of their home. A shown in FIGS. 13A and 13B, three aspects of this disclosure may provide improvements over conventional construction when it comes to aging in place.

First, the short floor joist span in the fixed-width zone W2 may allow sections of floor to be removed with no structural impacts to other portions of the structure, which may make it easier than conventional construction to install a new elevator shaft 310; a specific area for this purpose in the fixed-width zone may be identified during the design phase, and rated partitions may be installed at the time of initial construction to further ease future conversion.

Second, due to the proximity of the fixed-width zone W2 to the spine 120, rooms occupying spaces which may be dedicated at the time of initial design for future elevator shafts 310 need not be restricted to non-programmed functions such as storage closets 910 as is typically the case in residential construction today; rather, services such as plumbing, HVAC, and power/data may be more easily connected to and disconnected from uses in spaces identified for future elevator shafts 310.

Third, due to the continuous adjacency of spaces in the fixed-width zone W2 to the spine 120, any space in the fixed-width zone may be more easily modified to be converted for example from a powder room and breakfast nook 920 to a mobility-impaired-accessible full bathroom 930, either permanently or on a short-term basis while an elevator 315 is being installed to regain access to the upper floors of the residence. During the installation period for an elevator 315, the ground floor of the residential unit may be converted temporarily to single-floor living with an accessible bath 930 and a freestanding bed or murphy bed 960, thus minimizing the duration of displacement from the residential unit due to unexpected events. Further, units may be planned with doors and corridors that are wider than the minimum required by code, and built-in bookshelves 940 may be installed during initial construction and then removed when the additional width becomes necessary for wheelchair access. If the ground floor is elevated from the existing grade 500, a ramp 980, stair lift, chair lift or the like may be installed to provide wheelchair access to the ground-floor living space.

The benefits described in the case study illustrated in FIGS. 13A and 13B may accrue to the elderly and also to any residents faced with unexpected lifestyle changes. Further, rather than being constrained to limited lifestyle categories such as "starter homes" or "empty nester" homes, reconfigurable residential units may therefore be designed to function as "lifetime" homes, being more easily adaptable to residents' usage patterns as their needs and preferences evolve over time.

Figure 14:
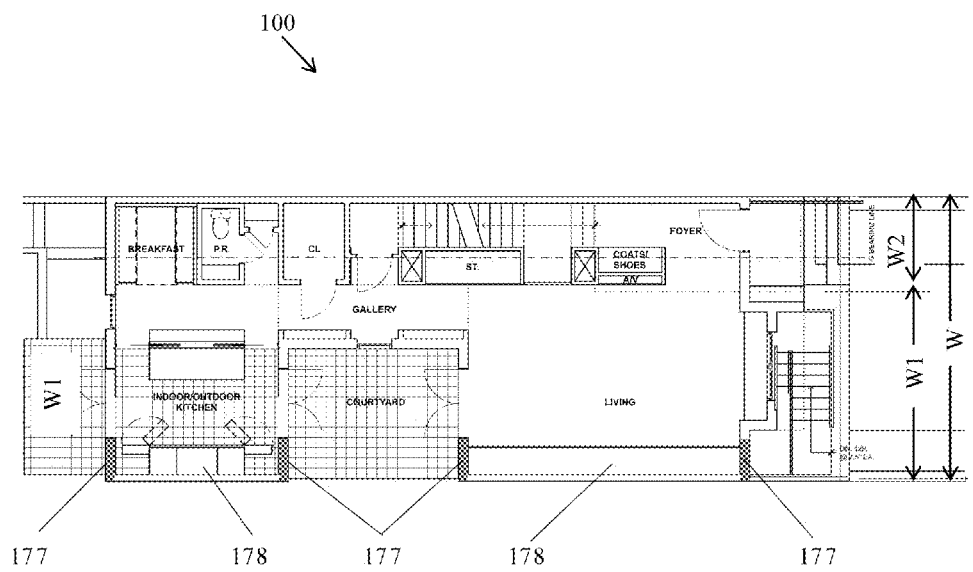
FIG. 14 is an example ground floor plan illustrating a principle for locating openings in exterior walls, e.g., doors or windows, in support of "future-enabling" a residential unit.

FIG. 14 is an example ground floor plan illustrating a principle for locating openings in exterior walls, e.g., doors or windows, in support of "future-enabling" a residential unit. A section of wall 177 extending e.g. a minimum of 2'-0" from party wall 100a may enable future installation of closets, built-in millwork, and/or furnishings 178 that might otherwise not be possible.

The system and principles of the present disclosure may include advantages or features including but not limited to:
1) There may be no interior load-bearing walls necessary
2) Since the vertical chases may be configured to extend above the roof (like chimneys), systems modifications may be made without damaging the roofing or voiding the roof warranty. For example, if adding solar power or solar hot water system, the conduit may be dropped through the vertical shafts into the connected utility room.
3) Plumbing supply lines or drains may be located away from the structural walls, but still within an interior of the building, so that the potential for leaks to damage the structure of the building may be eliminated, or at least be minimized.
4) Systems may be designed to be easily accessible for the life of the building. No major construction may be required to replace or upgrade mechanical, plumbing, electrical or data systems.

Example 1: A domestic gray water recycling is currently often not permitted in single family residences by municipal health departments. However, water treatment appliances are becoming available on the market that pre-treat waste water from showers, dishwashers and hand sinks for use in toilets. While the appliances themselves may be affordable, they require a complete re-routing of a home's plumbing piping, something that is often cost-prohibitive and generates a large amount of unnecessary construction waste in conventionally-constructed homes unless the home is undergoing a significant renovation. A "future-enabled" residence may allow the entire plumbing system to be replaced as a single-trade job without the need for general contractors. All of the plumbing may be accessible throughout the home and may be replaced without damaging structure, sheathing, millwork, trim, or interior finishes.

Example 2: Data technology is in a constant state of change. There is a trend toward increasing connectivity and centralized control of systems throughout the home, commonly referred to as the "Internet of Things" or "IoT." But in conventionally-constructed homes it may be cost-prohibitive to implement new technology, and that, in turn, serves as a barrier to the development of new technology for the home. In many cases, new technologies are designed to depend on often "buggy" wireless communications due to the fact that existing residential units cannot easily incorporate the installation of new, more robust hard-wired communications systems. In a "future-enabled" rowhouse, all power and data wiring may run through accessible raceways throughout the home, allowing new systems to easily be hard-wired to any desired location as a single trade job, without damaging existing interior finishes, millwork or trim.

5) No advance knowledge is required regarding what future systems might become available for homes; the access ceilings, bulkheads (services distribution spines), vertical chases and raceways may be designed to accommodate essentially all known mechanical, electrical, plumbing and data systems. This may provide ample space and continuous routing for as-yet-unknown technologies and systems.
6) Rowhouses may be structurally isolated, and not built as a single continuous building. At each party wall condition, each "future-enabled" rowhouse may have its own independent fire-rated structural bearing wall. This may eliminate damage to adjacent rowhouses and eliminate deterioration of fire rating if one rowhouse is renovated or demolished.
7) May eliminate building obsolescence. "Future-enabled" rowhouses or similar residential units may have the capability to keep up with evolving housing trends. In addition to the physical benefits of non-obsolescent buildings, there may be financing and other benefits as well. For example, a non-obsolescent building may not depreciate at the same rate as a conventionally-built home, and if not, additional financing models may become available to owners beyond the standard 30- or 15-year mortgages.

Residential units built according to the principles of this disclosure may offer a significant improvement over current industry practices for design and construction of residential units, in that they may provide for future adaptation and modification after the completion of initial construction. In conventional construction, whether completely field-fabricated (aka "stick built") or manufactured in an off-site production facility (aka "modular"), the emphasis is most commonly placed on optimizing for the highest efficiency of initial construction or fabrication, typically with little or no concern for how the building performs after occupancy. Over the anticipated life of buildings, change is inevitable, and if not planned for in advance may result in excessive waste and cost. Elements and systems that may be more easily incorporated into homes built according to the principles of the disclosure include: upgrading or replacing power/data cabling; replacing an existing conventional plumbing system with a manifold-style and/or graywater reuse system; replacing an existing ducted forced air HVAC system with a new ductless mini-split heat pump system; adding a central vacuum system; adding a laundry chute; adding rooftop photovoltaic and/or solar hot water panels; providing mechanical, plumbing, electrical, data and other services to un-served spaces in the house, such as when a closet is converted to a wet bar, laundry room, server room or the like.

For the purposes of this disclosure, a distinction is made between the terms "townhomes" and "rowhouses" in order to illustrate potential benefits of residential units built according to the principles of the disclosure. The term "Townhome," as we define it here, refers to the current standard practice for constructing attached row dwelling units. The term "rowhouse" refers to a more traditional attached dwelling unit, for example the rowhouses popular in urban neighborhoods at the beginning of the 20$^{th}$ century, and a form that has regained popularity with the recent increase in the use of traditional town planning techniques in contemporary developments. Table 1 below lists some unique aspects for townhomes and rowhouses, respectively.

TABLE 1

|  | "Townhome" | "Rowhouse" |
|---|---|---|
| Common uses/functions | Single-family home<br>Single-family home with home office<br>Rental—single-family home or group home | Single-family home<br>Single-family home with home office<br>Rental—single-family or group home<br>Condos—stacked duplexes<br>Condos—stacked flats<br>Live/Work<br>Office—single tenant<br>Office—multi-tenant<br>Residential or storefront office or retail |
| Relationship to street | Main living level typically at second floor, over garage; reduced interaction with street life | Main living level typically within a few feet above street; encourages spontaneous interaction with street life |
| Lot depth | Typically equal to the depth of the house | Typically deeper than the house—opportunity for back yard and/or detached carport, garage, carriage house, or the like |
| Streets/alleys/parking | May be street grid or cul-de-sac; Alleys have also become commonplace. Off-street parking provided via ground-floor garages | Typically street grid with alley access to parking spaces detached carport, garage, or carriage house. |
| Façade diversity | Typically very little aesthetic diversity; a small number of façade versions are repeated with little variation. Streets tend to | Typically provide rich aesthetic diversity, with varying façade massing and detail even among homes built by one builder at the |

TABLE 1-continued

|  | "Townhome" | "Rowhouse" |
|---|---|---|
|  | feel bland/suburban even when built in urban areas. | same time. |
| Adaptation over time | Exterior modifications typically restricted by HOA's and ARB's. Homes age (decay) but are less likely to be rejuvenated or updated over time. Blocks and neighborhoods become less desirable over time. | Typically updated over the life of the home; Houses, blocks, streets and neighborhoods become more interesting over time as the rowhouses age and take on the individuality of their owners. |
| Aging in place | Aging-in-place is restricted. | Aging-in-place may be facilitated. |

With the use of shared walls and other locked-in elements, townhomes built using current standard practice are not able to provide the range of common uses or functions identified for rowhouses, since shared party ownership elements require underlying legal communal ownership structures such as cooperatives, condominiums and/or homeowner's associations or the like.

Further, communal ownership structures such as condo associations or HOA's are typically required for conventionally-built townhome communities due to the shared structural elements often employ rules and/or design review committees such as Architectural Review Boards. These in turn typically restrict individual property owners from making changes to the exteriors of their residential dwelling units, reducing facade diversity and reducing the ability of individual residences within an attached dwelling community to be adapted over time. This creates a situation where attached dwelling communities are unable to renew themselves and instead allow the individual units to collectively decay at roughly the same arrested rate. Conversely, residences built according to the principles of the disclosure may be structurally independent fee-simple ownership rowhouses, which may remove the need to create underlying communal ownership structures and therefore may unlock the additional benefits attributed to rowhouses in the table above. In addition to single-use residential structures, structures built according to the principles of the disclosure may enable reconfigurable mixes of use, such as: multi-unit residential; live/work; residential over retail; residential over office; single- or multi-tenant office; office over retail; and other combinations of uses. To maintain code-required fire separation between different uses, additional fire-resistant construction may be provided at the time of initial construction or at the time of future alterations to floor systems 115, while maintaining access ceilings to the extent allowed by code.

By way of non-limiting examples, the system of the disclosure can be configured and expanded in the following ways:

Base case—Longitudinal: The fixed-width zone may comprise the mechanical, plumbing, electrical, data and other systems spine and vertical circulation (stairs, elevators, and other means of vertical mobility), oriented longitudinally (front-to-back) on a narrow site. Testing of the system has shown that the longitudinal orientation may work optimally for structures ranging from 18 feet to 30 feet in width. The "fixed-width" zone may be designed in a pre-determined number of standard widths, e.g. 6' wide, 8' wide, and 10' wide. The longitudinal configuration may be applied to, but is not limited to, rowhouses, townhomes, apartment homes, triplexes, duplexes, "Charleston-style" side-yard houses, and narrow detached homes.

Alternate case 1—Transverse: The fixed-width zone may comprise the mechanical, plumbing, electrical, data and other systems spine and vertical circulation (stairs, elevators, and other means of vertical mobility), oriented transversely (side-to-side) on a wider site. The "fixed-width" zone may be designed in a pre-determined number of widths, e.g. 6' wide, 8' wide, and 10' wide. In this configuration, building width is unlimited, and testing has shown that this orientation may work optimally for structures ranging from 20' to 30' in depth. The transverse configuration may be applied to, but is not limited to, villa- or garden-style attached housing, apartment homes, and single-family homes.

Alternate case 2—Ganged single-family: One or more longitudinal-configuration chassis may be combined with one or more transverse-configuration chassis to create a compound-chassis home. A compound chassis may comprise pairs of longitudinal-configuration chassis, or may comprise pairs of transverse-configuration chassis. A compound chassis does not necessarily require a mix of both a longitudinal-configuration chassis and a transverse-configuration chassis. A chassis may or may not be required to be joined to connect mechanical, plumbing, electrical, data, and other systems throughout the structure. In this case, length and width are essentially unlimited.

Alternate case 3—Ganged/stacked multi-family: Either the longitudinal configuration or the transverse configuration, or both configurations used in combination, may be ganged and/or stacked in single buildings to create multi-family housing. Additional benefits of using this system in multifamily may include the ability to cost-effectively re-configure unit sizes and unit mixes to meet changing market demand.

Alternate case 4—Alternative construction materials: For initial cost control, the base case has been configured for wood and timber construction. However, the disclosure comprises primarily a building structure organization and mechanical, plumbing, electrical, data, and other systems access system; therefore application of the system using different construction materials still falls under the principles of this disclosure.

While the disclosure has been described in terms of examples, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A method for providing a reconfigurable residential unit comprising:
    providing a first chassis comprising a fixed-width portion and a flexible-width portion, the fixed-width portion having a first side and a second side;
    providing at least one horizontal services bulkhead within the fixed-width portion and aligned along the first side of the fixed-width portion and configured to provide a passageway for one or more residential service systems;
    providing at least one vertical services distribution shaft within the fixed-width portion and aligned with the first side of the fixed-width portion and intersecting the at least one horizontal services bulkhead, the at least one vertical services distribution shaft configured to extend from a bottom floor to a top floor of the residential unit for distributing the one or more residential service systems to each floor of the residential unit, the at least one horizontal services bulkhead and the intersecting at least one vertical services distribution shaft together form at least one continuously-connected services distribution spine;
    providing a party wall along the second side of the fixed-width portion, the party wall adjacent to a second residential unit having a second chassis; and
    providing a plurality of joists to support at least one floor system across the flexible-width portion, the plurality of joists extending horizontally from the at least one horizontal services distribution spine in an uninterrupted manner.

2. The method of claim 1, wherein the second chassis mirrors or is in parallel sequence to the first chassis.

3. The method of claim 1, wherein in the step of providing at least one horizontal services bulkheads includes providing a plurality of horizontal services bulkheads and the step for providing at least one vertical services distribution shaft provides a plurality of vertical services distribution shafts.

4. The method of claim 3, wherein each of the plurality of horizontal services bulkheads intersects each of the plurality of vertical services distribution shafts.

5. The method of claim 3, wherein each of the plurality of horizontal services distribution spines extends from a first end of the residential unit to an opposite end of the unit.

6. The method of claim 3, wherein the plurality of horizontal services bulkheads and the plurality of vertical services distribution shafts each distribute the one or more residential service systems to each floor of the residential unit.

7. The method of claim 6, wherein the one or more residential service systems comprise a plurality of: a HVAC system, an electrical system, a plumbing system, a communication system.

8. The method of claim 6, wherein the one or more residential service systems is accessible through each of the plurality of horizontal services bulkheads and the plurality of vertical services distribution shafts.

9. The method of claim 1, wherein the step of providing at least one vertical services distribution shaft includes providing at least one vertical services distribution shaft that extends to or through the roof of the residential unit and is accessible from the roof.

10. The method of claim 1, wherein the step of providing at least one horizontal services bulkhead includes providing a plurality of horizontal services bulkheads within the fixed-width portion creating a plurality of residential living spaces therebetween.

11. The method of claim 10, further comprising installing an elevator within one of the plurality of residential living spaces.

12. The method of claim 1, wherein the step of providing at least one horizontal services bulkhead within the fixed-width portion creates a space between the at least one horizontal services bulkhead and the party wall for a stairwell.

13. The method of claim 1, wherein the step of providing the plurality of joists to support at least one floor system permits horizontal routing of the one or more residential service systems from the at least one horizontal services bulkhead into the flexible-width area.

14. A reconfigurable residential unit constructed according to the method of claim 1.

15. A method for providing reconfigurable residential units comprising:

providing a first chassis and a second chassis each comprising a fixed-width portion and a flexible-width portion, the fixed-width portion having a first side and a second side, the first and second chassis each with independent, adjacent party wall;

providing a plurality of horizontal services bulkheads within each fixed-width portion aligned along each respective first side of the fixed-width portion and each of the plurality of horizontal services bulkheads configured to provide a passageway for one or more residential service systems;

providing a plurality of vertical services distribution shafts within each fixed-width portion in which each vertical services distribution shaft intersects with the plurality of horizontal services bulkheads, each of the plurality of vertical services distribution shafts configured to extend from a first floor to a second floor of a respective one of the residential units for distributing the one or more residential service systems to each floor of the respective residential unit; and providing a plurality of joists to support at least one floor system across a flexible-width portion of each residential unit, the plurality of joists extending horizontally from at least one of the plurality of horizontal services bulkhead in an uninterrupted manner.

16. The method of claim 15, wherein the plurality of horizontal services bulkheads and the plurality of vertical services distribution shafts each distribute the one or more residential service systems to each floor of a respective residential unit.

17. The method of claim 16, wherein the one or more residential service systems comprise a plurality of: a HVAC system, an electrical system, a plumbing system, a communication system.

18. A reconfigurable residential unit comprising;
a first chassis comprising a fixed-width portion and a flexible-width portion, the fixed-width portion having a first side and a second side;
at least one horizontal services bulkhead within the fixed-width portion and aligned along the first side and configured to provide a passageway for one or more residential service systems;
at least one vertical services distribution shaft within the fixed-width portion and intersecting the at least one horizontal services bulkhead, the at least one vertical services distribution shaft configured to extend from a bottom floor to a top floor of the residential unit for distributing the one or more residential service systems to each floor of the residential unit;
a party wall along the second side of the fixed-width portion, the party wall adjacent to a second residential unit having a second chassis; and
a plurality of joists to support at least one floor system across the flexible-width portion, the plurality of joists extending horizontally from the at least one horizontal services bulkhead in an uninterrupted manner.

19. The reconfigurable residential unit of claim 18, wherein at least one horizontal services bulkhead comprises a plurality of horizontal services bulkheads and the at least one vertical services distribution shaft comprises a plurality of vertical services distribution shafts, and each of the plurality of horizontal services bulkheads and each of the least one vertical services distribution shaft distribute the one or more residential service systems to each floor of the residential unit.

20. The reconfigurable residential unit of claim 19, wherein the one or more residential service systems comprise a plurality of: a HVAC system, an electrical system, a plumbing system, a communication system.

21. The reconfigurable residential unit of claim 19, wherein the one or more residential service systems is accessible through each of the plurality of horizontal services bulkheads and the plurality of vertical services distribution shafts.

* * * * *